(12) United States Patent
Vanderwiel

(10) Patent No.: US 7,076,323 B2
(45) Date of Patent: Jul. 11, 2006

(54) APPARATUS AND METHOD FOR CREATING SKETCH-BASED EGGCRATE SUBSTRUCTURES FOR COMPOSITE PARTS

(75) Inventor: Thomas J. Vanderwiel, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/774,220

(22) Filed: Feb. 6, 2004

(65) Prior Publication Data

US 2005/0177262 A1 Aug. 11, 2005

(51) Int. Cl.
*G06F 19/00* (2006.01)
*G06F 9/46* (2006.01)
*G05B 15/00* (2006.01)
*G05B 19/42* (2006.01)

(52) U.S. Cl. .......................... 700/182; 700/83; 700/86; 700/97; 700/98; 700/117; 703/1; 718/101

(58) Field of Classification Search .................. 700/28, 700/29, 83, 86, 97, 98, 104, 117, 180, 182; 718/101; 703/1
See application file for complete search history.

(56) References Cited

U.S. PATENT DOCUMENTS

| 4,697,240 | A | * | 9/1987 | Cedar et al. ................. 700/160 |
| 4,917,394 | A | | 4/1990 | Lin |
| 5,321,835 | A | * | 6/1994 | Tanaka et al. .............. 718/101 |
| 5,364,491 | A | | 11/1994 | Aochi et al. |
| 5,701,403 | A | * | 12/1997 | Watanabe et al. ........... 345/419 |
| 5,856,210 | A | | 1/1999 | Leavitt et al. |
| 6,606,528 | B1 | * | 8/2003 | Hagmeier et al. ............ 700/98 |
| 6,675,059 | B1 | * | 1/2004 | Scott .......................... 700/166 |
| 6,775,585 | B1 | * | 8/2004 | Bedont et al. .............. 700/182 |

* cited by examiner

*Primary Examiner*—Leo Picard
*Assistant Examiner*—Sean Shechtman
(74) *Attorney, Agent, or Firm*—Sonnenschein Nath & Rosenthal LLP

(57) ABSTRACT

An apparatus and method of creating a sketch-based eggcrate substructure for manufacturing composite parts, includes creating an input model from a plurality of inputs; launching a batch job using the created input model; and obtaining an output model by running the batch job, or running the program interactively using the input model and obtaining an output model.

67 Claims, 31 Drawing Sheets

3D SPACE OUTPUT

Please fill out the form and submit.     LMBAJ Home Page     Online Usage Guide     Job Logs     Input Demo Videos     KBPD

Form Index

Title Block
Geometry Input Specs 1
Geometry Input Specs 2
Geometry Input Specs 3
Top Curve Inputs
Interlock Slot Inputs
AC Notch Inputs
Diagonal Inputs
Lightening Hole Set Inputs
Output Options

GEOMETRY INPUT SPECS 2

| Thickness & Types | Color(s) | Layer(s) | Offset n Layers |
|---|---|---|---|
| Q: Bottom Stiffener Intercostal Locations: Thk: [.25] Height: [6.0] Overhang: [0.0] Fillet Radius: [.25] LHP: ○NO ●YES Type: □Line □Plane | □White □Cyan □Yellow □Gray □Green □Blue □Magenta □Red | | default |
| Contour Seam Support Locations: Thk: [.25] Depth: [4.0] Type: □Line □Plane | □White □Cyan □Yellow □Gray □Green □Blue □Magenta □Red | | default |
| Diagonal CB Intercostal Locations: Thk: [.25] Type: □Line □Plane | □White □Cyan □Yellow □Gray □Green □Blue □Magenta □Red | | default |
| Diagonal Interior Intercostal Locations: Thk: [.25] Type: □Line □Plane | □White □Cyan □Yellow □Gray □Green □Blue ☑Magenta □Red | [5] | |
| Snap to Diagonal Locations: ☑Line □Plane | □White □Cyan □Yellow □Gray □Green □Blue □Magenta □Red | | |
| Diagonal Locations: □Line □Plane | □White □Cyan □Yellow □Gray □Green □Blue □Magenta □Red | [5] | |
| Stayout Area Solids: ☑Solid | □White □Cyan □Yellow □Gray □Green □Blue □Magenta □Red | | |
| Lightening Hole Stayout Area Solids: ☑Solid | □White □Cyan ☑Yellow □Gray □Green □Blue □Magenta □Red | [6] | |

[ Submit Job ]

FIG. 8

Please fill out the form and submit.    LMBAJ Home Page    Online Usage Guide.    Job Logs    Input Demo Videos    KBPD

Form Index

Title Block
Geometry Input Specs 1
Geometry Input Specs 2
Geometry Input Specs 3
Top Curve Inputs
Interlock Slot Inputs
AC Notch Inputs
Diagonal Inputs
Lightening Hole Set Inputs
Output Options

[ Submit Job ]

GEOMETRY INPUT SPECS 3
(Non-Quick Sketch Supports)

| Thickness & Type(s) | Color(s) | Layer(s) | Offset n Layers |
|---|---|---|---|
| Periphery Locations:<br>Thk: - (See Input Specs 1) Type: ☐Line ☐Plane | ☐White ☐Cyan ☐Yellow ☐Gray<br>☐Green ☐Blue ☐Magenta ☐Red | | See Specs 1 |
| Interior Header Locations:<br>Thk: - (See Input Specs 1) Type: ☐Line ☐Plane | ☐White ☐Cyan ☐Yellow ☐Gray<br>☐Green ☐Blue ☐Magenta ☐Red | | See Specs 1 |
| Interior Intercostal Locations:<br>Thk: - (See Input Specs 1) Type: ☐Line ☐Plane | ☐White ☐Cyan ☐Yellow ☐Gray<br>☐Green ☐Blue ☐Magenta ☐Red | | See Specs 1 |
| CB-Interior Header Locations:<br>Thk: Depth: - (See Input Specs 1)<br>Fillet Radius: LH?: - (See Input Specs 1)<br>Type: ☐Line ☐Plane | ☐White ☐Cyan ☐Yellow ☐Gray<br>☐Green ☐Blue ☐Magenta ☐Red | | See Specs 1 |
| CB-Interior Intercostal Locations:<br>Thk: Depth: - (See Input Specs 1)<br>Fillet Radius: LH?: - (See Input Specs 1)<br>Type: ☐Line ☐Plane | ☐White ☐Cyan ☐Yellow ☐Gray<br>☐Green ☐Blue ☐Magenta ☐Red | | See Specs 1 |
| Bottom Stiffener Intercostal Locations:<br>Thk: Depth: - (See Input Specs 2)<br>Fillet Radius: LH?: - (See Input Specs 2)<br>Type: ☐Line ☐Plane | ☐White ☐Cyan ☐Yellow ☐Gray<br>☐Green ☐Blue ☐Magenta ☐Red | | See Specs 2 |

Please fill out the form and submit.

LMBAJ Home Page    Online Usage Guide    Job Logs    Input Demo Videos    KBPD

Form Index

Title Block
Geometry Input Specs 1
Geometry Input Specs 2
Geometry Input Specs 3
Top Curve Inputs
Interlock Slot Inputs
AC Notch Inputs
Diagonal Inputs
Lightening Hole Set Inputs
Output Options

[ Submit Job ]

AIR CIRCULATION NOTCH INPUTS

Include Air Circulation notch features?: ○NO ●YES   Place Notchs at Interlock Slot Joints?: ○NO ●YES
Air Circulation Notch type: [filleted-notch ▼]   Place Notchs at Butt Joints?: ○NO ●YES

- Minimum Separation: [2.25]
- Min notch-to-notch: [1.95]
- End Separation: [1.0]
- Notch Depth: [2.0]
- Max Notch Width: [4]
- Min Notch Width: [3.5]
- Notch fillet Radius: [.75]

Spacing Curve Smoothing Inputs

- Smooth Out AC Set Spacing Curve?: ●NO ○YES
- Spacing Curve Smoothing radius: [0.50]

Thin Solid Area Test Inputs

- Check front and rear of notch for thin area?: ○NO ●YES
- Offset Test Distance: [0.25]
- Minimum Test Angle: [30.0]

Basis Area vs Final Area Test M4

- Check Area Using Area Test M4?: ●NO ○YES
- Test Factor: [3/4]

FIG. 10C

Please fill out the form and submit:   LMBAI Home Page   Online Usage Guide   Job Logs   Input Demo Videos   KBPD

Form Index

Title Block
Geometry Input Specs 1
Geometry Input Specs 2
Geometry Input Specs 3
Top Curve Inputs
Interlock Slot Inputs
AC Notch Inputs
Diagonal Inputs
Lightening Hole Set Inputs
Output Options

DIAGONAL INPUTS

All Diagonal Types:

- Thickness: [1]
- Height: [5.0]
- Same Diagonal Length Tol: [0.030]
- Interlock Slot Rounded Corners?: ○NO ⊙YES
- Interlock Slot to Slot Clearance: [0.060]
- Interlock Slot Edge Clearance: [0.030]

Snap-to Diagonals:

- Solving Tolerance: [0.0005]
- Use 2nd Algorithm?: ○NO ⊙YES
- Maximum Number of Iterations: [100]
- Solved Length Clearance: [0.0]
- Stayout Area Added Clearance: [0.0]

[ Submit Job ]

FIG. 10D

Please fill out the Form and submit.

| LMBAJ Home Page | Online Usage Guide | Job Logs | Input Demo Videos | KBPD |

Form Index

Title Block
Geometry Input Specs 1
Geometry Input Specs 2
Geometry Input Specs 3
Top Curve Inputs
Interlock Slot Inputs
AC Notch Inputs
Diagonal Inputs
Lightening Hole Set Inputs
Output Options

[ Submit Job ]

LIGHTENING HOLE INPUTS

Include Lightening Hole features?: ○ NO ⊙ YES
Lightening Hole type: [Blended Rectangle ▼]
Stacked Lightening Hole features?: ⊙ NO ○ YES

- Fillet Radius: [1.25]
- Separation: [2]
- Stack separation: [1.75]
- End separation: [1.5]
- Base edge margin: [3.5]
- Top Offset: [2.5]

- Max hole width: [21]
- Min hole width: [6]
- Max hole height: [20.]
- Min hole height: [6.]
- Use Unblended Holes?: ⊙ NO ○ YES
- Valid Hole Test Factor: [1.0]

Blended Truss Inputs

- Double Truss?: ○ NO ⊙ YES
- Single Truss Pattern: [alternate-stack-and-subset ▼]
- Truss Width: [1.]

Stayout Area Inputs

- Stayout Area Offset Distance: [2.3]

FIG. 10E

Please fill out the form and submit

LMBAJ Home Page    Online Usage Guide    Job Logs    Input Demo Videos    KRPD

Form Index

Title Block
Geometry Input Specs 1
Geometry Input Specs 2
Geometry Input Specs 3
Top Curve Inputs
Interlock Slot Inputs
AC Notch Inputs
Diagonal Inputs
Lightening Hole Set Inputs
Output Options

[ Submit Job ]

Output Options

- All Supports CATIA Output Method: [Inner Domain Solid ▼]
- Solid Modeler Mode: [In-Memory ▼] (Use :Local for large or complex Tools)
- CATIA v4 output formatted for CATIA v5?: ○ NO ⦿ YES (Create a detail for each Support -> v5 Parts)

CATIA v4 output formatted for CATIA V5 - Options:

- Test for like Supports for each Support Type?: ○ NO ⦿ YES (v5 Products)
- Create Sub-Assemblies for each Support Type?: ⦿ NO ○ YES (v5 Products)
- Create a Sub-Assembly for Diagonals?: ⦿ NO ○ YES (v5 Product)
- Support Sketch Location: [Left ▼] Diagonal Sketch Location: [Left ▼]
- Output Supports As: [Inner Domain Solid ▼] Output Diagonals As: [Inner Domain Solid ▼]

FIG. 10F

ITS
Intelligent Tooling System

ICAD Input Spec Sheet

Job Data
Date: 7/6/1999
Icad Version: 7.0.1
Application: Eggcrate Substructure Module
Version: 11
Name: John Doe
Organization: A-1021
Phone Number: 555-5555

Tool Info
Tool Code: LM
Tool Number: 123X4567-TEST
Sheet Number: 1
Sheet Rev Level: NEW
Part Number: 1
Tdr TI Co Number: 11234567

| Input Attribute | Value |
| --- | --- |
| Periphery Support Thk: | 0.375 |
| Interior Support Thk: | 0.25 |
| Contour Seam Support Thk: | 0.25 |
| Contour Seam Support Depth: | 4 |
| Periphery Support Layer: | NIL |
| Interior Intercostal Support Layer: | NIL |
| Interior Header Support Layer: | NIL |
| Contour Seam Support Layer: | NIL |
| Reduce Bspline Segmentation For Output?: | 0.01 |
| Reduce Bsplines To Lines For Output?: | 0.005 |
| Reduce Bspline To Lines Chord Ht: | T |
| Reduce Bspline To Lines Chord Ht Tol: | |
| Ac Include Air Circulation Notch Features?: | |
| Ac Notch Pattern: | FILLETED-NOTCH |
| Ac Min Separation: | 2.0 |
| Ac Min Notch To Notch Separation: | 1.7 |
| Ac End Separation: | 1.0 |
| Ac Notch Depth: | 2.0 |
| Ac Max Notch Width: | 4.0 |
| Ac Min Notch Width: | 2.5 |
| Ac Notch Fillet Radius: | 0.5 |
| Ac Default Fit Factor: | 0.6 |
| Ac Bottom Fit Factor: | 0.6 |
| Lh Include Lightening Hole Features?: | T |
| Lh Type: | BLENDED-RECTANGLE |
| Lh Fillet Radius: | 0.5 |
| Lh Max Hole Width: | 22 |
| Lh Min Hole Width: | 6 |
| Lh Truss Thickness: | 1 |
| Lh Stacked Holes?: | T |

Page 1 of 2

ICAD Input Spec Sheet

Job Data
Date: 7/6/1999
Icad Version: 7.0.1
Application: Eggcrate Substructure Module
Version: 11
Name: John Doe
Organization: A-1021
Phone Number: 555-5555

Tool Info
Tool Code: LM
Tool Number: 123X4567-TEST
Sheet Number: 1
Sheet Rev Level: NEW
Part Number: 1
Tdr TI Co Number: 11234567

| Input Attribute | Value |
| --- | --- |
| Lh Stack Separation: | 1 |
| Lh Max Hole Height: | 12 |
| Lh Min Hole Height: | 6 |
| Lh Double Truss?: | T |
| Lh Single Truss Pattern: | ALTERNATE-STACK-AND-SUBSET |
| Lh Stayout Area Solids: | NIL |
| Lh Remove Holes That Touch?: | NIL |

Page 2 of 2

FIG. 16B  2D Drew (Input Spec Sheets)

US 7,076,323 B2

APPARATUS AND METHOD FOR CREATING SKETCH-BASED EGGCRATE SUBSTRUCTURES FOR COMPOSITE PARTS

BACKGROUND OF THE INVENTION

The present invention relates to an apparatus and method for creating a sketch-based eggcrate substructure for manufacturing composite parts, using an automated tool design program.

In conventional tool design systems, tool design engineers spend a great deal of time generating CATIA (by Dassault Systemes) detail geometry (i.e., creating lines, arcs, points, etc.) in designing a LM (Lay-up Mandrel) to produce a Computer-Aided Design (CAD) model of their concept. Once the CAD model is created, changing the basic design requires recreating many of the detail CAD elements, generating a need for a KBE (Knowledge-based Engineering) application allowing engineers to iterate designs without regenerating detailed geometry.

Conventional LM KBE applications are restricted to four-sided rectangular tool designs and simple contours. For example, existing applications only allow internal substructure headers at right angles to each other and are usually site specific. Accordingly, a more simplified input design creation process, which is more flexible, is needed. The present invention overcomes those limitations and simplified the input creation process, adding a great deal of design flexibility.

SUMMARY OF THE INVENTION

Briefly, the present invention includes a method of creating a sketch-based eggcrate substructure for manufacturing composite parts comprising creating an input model from a plurality of inputs, and launching a batch job of said created input model.

In another aspect, the invention includes apparatus for creating a sketch-based eggcrate substructure for manufacturing composite parts comprising means for creating an input model from a plurality of inputs, and means for launching a batch job of said created input model.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

FIG. 6 is a screen shot of a Form Index and Title Block Inputs form of the computer software program for creating a sketch-based eggcrate substructure for manufacturing composite parts according to one embodiment consistent with the present invention;

Figure 7:
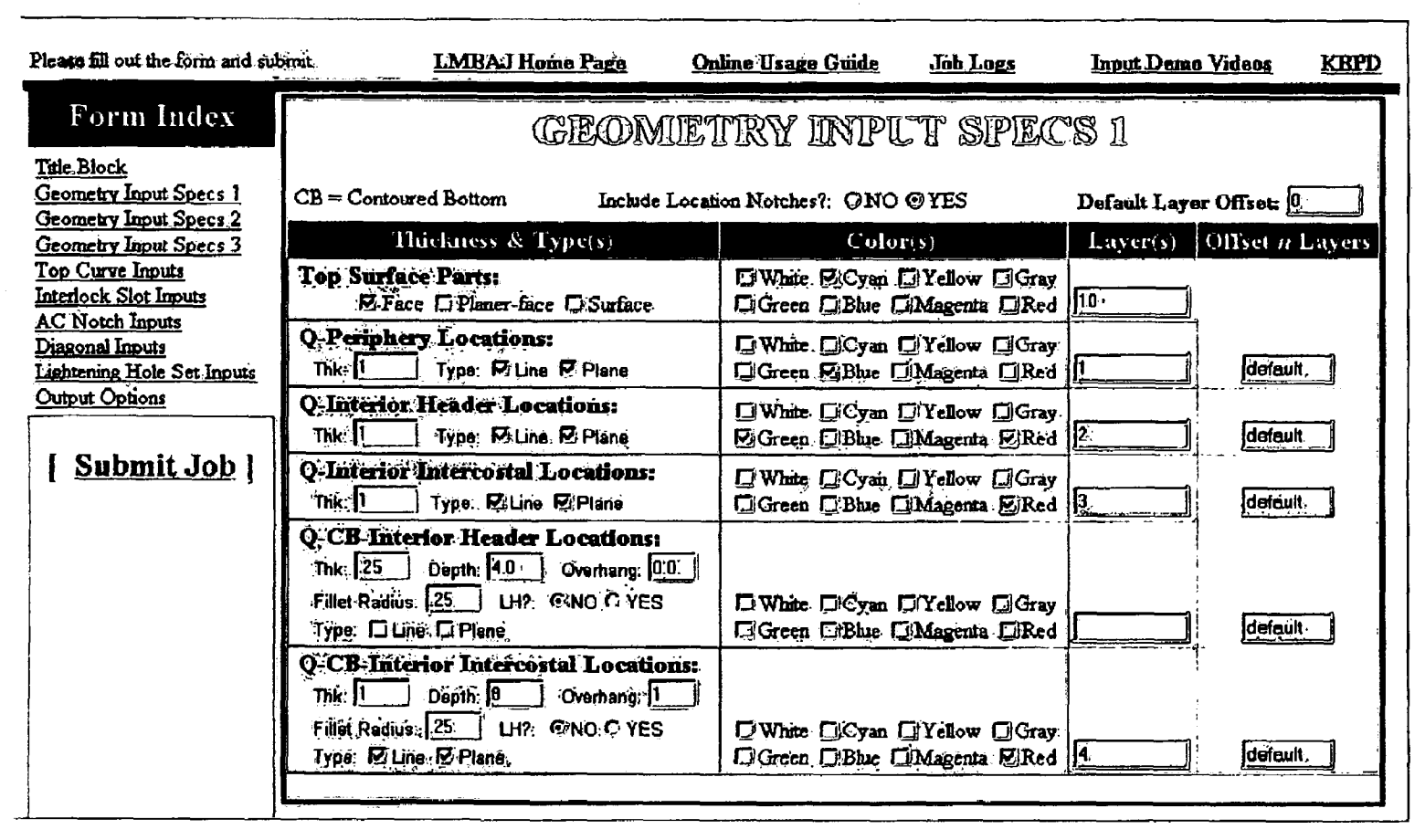

FIG. 7 is a screen shot of the Geometry Input Specs 1 of the computer software program for creating a sketch-based eggcrate substructure for manufacturing composite parts according to one embodiment consistent with the present invention;

FIG. 8 is a screen shot of the Geometry Input Specs 3 of the computer software program for creating a sketch-based eggcrate substructure for manufacturing composite parts according to one embodiment consistent with the present invention;

FIG. 9 is a screen shot of the Geometry Input Specs 3 of the computer software program for creating a sketch-based eggcrate substructure for manufacturing composite parts according to one embodiment consistent with the present invention;

Figure 10A:
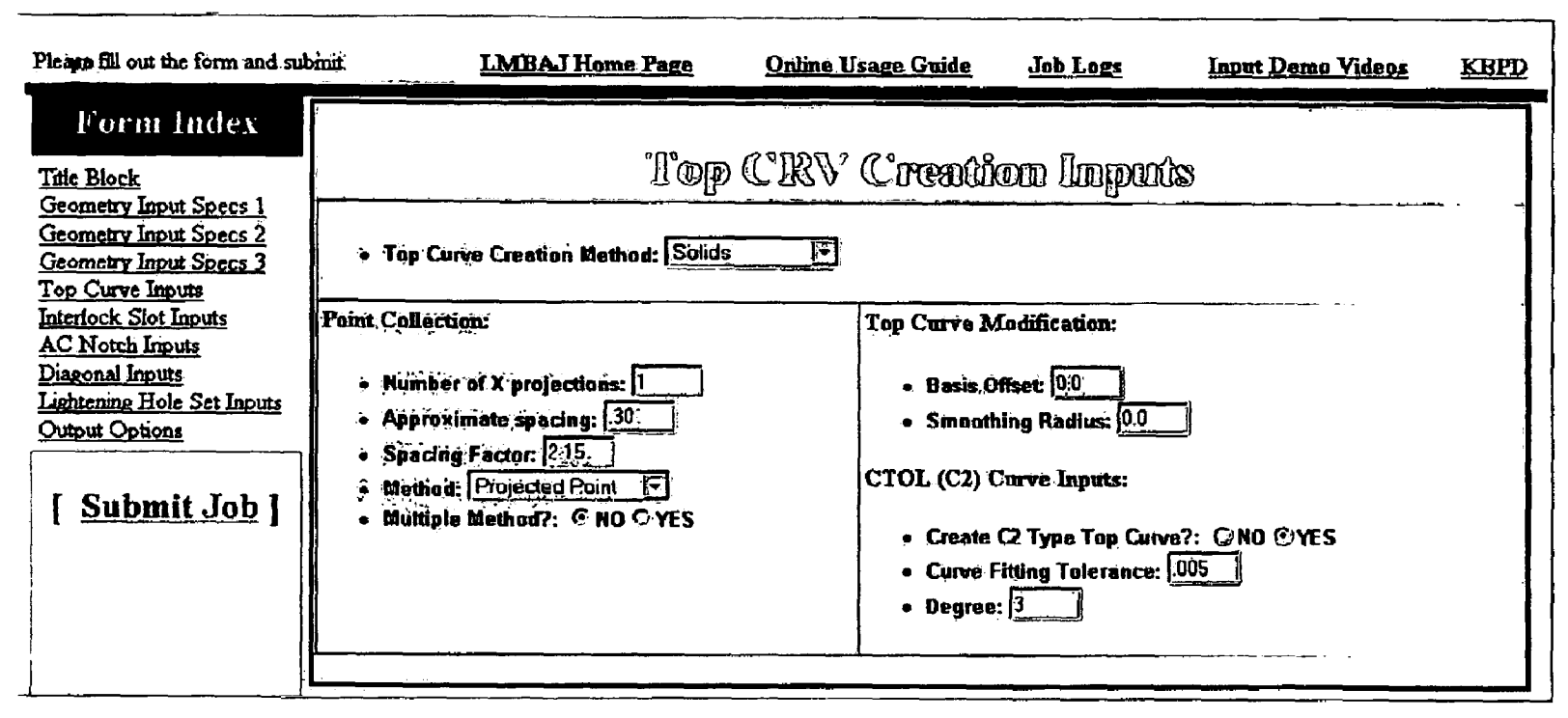
Figure 10B:
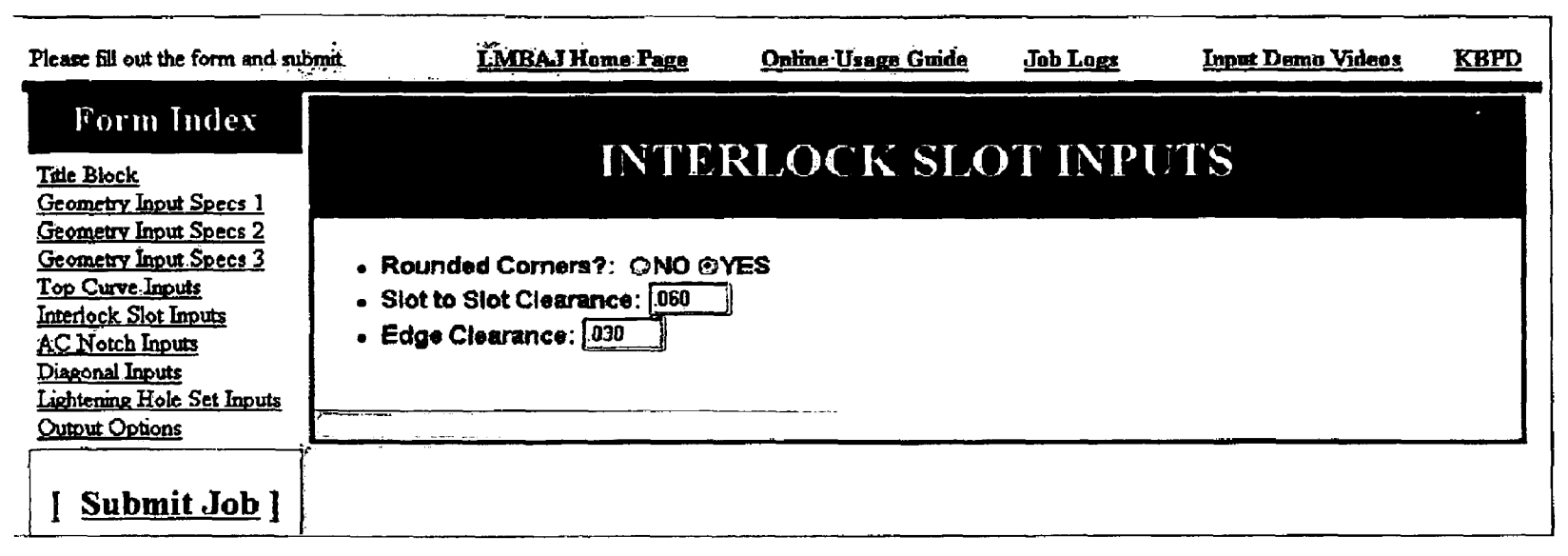

FIG. 10A (Top CRV Creation Inputs), FIG. 10B (Interlock Slot Inputs), FIG. 10C (Air circulation Notch Inputs), FIG. 10D (Diagonal Inputs), FIG. 10E (Lightening Hole Inputs), and FIG. 10F (Output Options) are screen shots of various input specs of the computer software program for creating a sketch-based eggcrate substructure for manufacturing composite parts according to one embodiment consistent with the present invention;

Corresponding reference characters indicate corresponding parts throughout the several views of the drawings.

DETAILED DESCRIPTION OF THE INVENTION

Figure 1:
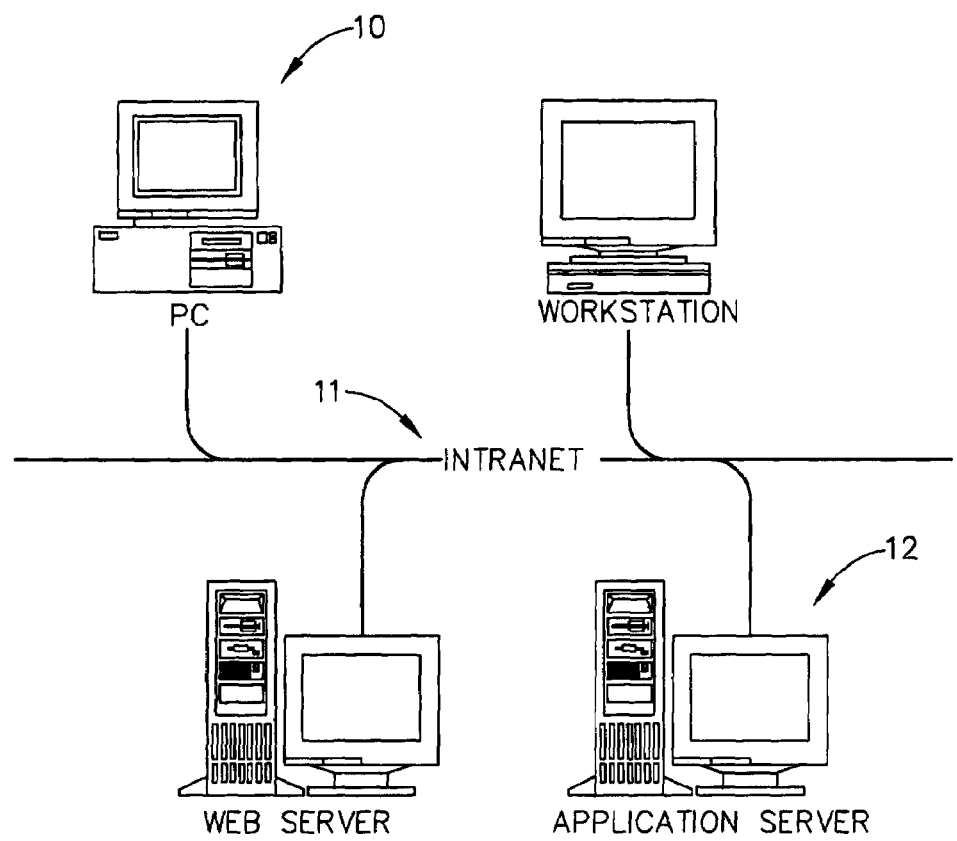
FIG. 1 is a schematic of a system architecture used to perform the methods and system consistent with the present invention.

The present invention relates to an apparatus and method for creating a sketch-based eggcrate substructure for manufacturing composite parts, using an automated tool design program. In one embodiment consistent with the present invention, the program is a Knowledge Based Engineering (KBE) tooling application used for creating eggcrate substructures from a three-dimensional (3D) CAD sketch for many tool types (LMs, Master Models, Part Models, holding fixtures, etc.), and includes a Graphical Interactive Interface (GII) function with a menu structure.

In particular, the present invention relates to an LMBAJ (KBE) application created to generate a wide variety of eggcrate substructures for LM type tools. The application captures the design rules for the various features of an LM eggcrate substructure.

The application geometric inputs can be a CAD file from, for example, various CAD systems such as CATIA, UG, and IGES in the form of an input model. This input model may be used by the application via a batch job launched from the web or by running the application interactively. In particular, the inputs from the CAD file are read in to the application using the ICAD Input Interface Toolkit. ICAD is software for developing and operating knowledge based generative design systems. Applications are developed in ICAD native programming language IDL (ICAD Design Language), which is an extension of LISP—the primary language of artificial intelligence. ICAD extensions to LISP provide tools for the definition, manipulation, and analysis of geometry and "rules". Complex surface and solid modeling capabilities are incorporated into ICAD object oriented syntax.

ICAD applications are typically designed to automate a specific design task. A combination of CAD geometry, numeric data, and user-supplied parameters are used as input. The ICAD developer generates rules that specify how the data is to be manipulated. These rules process the input data in the manner specified, and produce an output, which is typically a geometric model for export to CATIA.

In the present application, the input CAD file contains surface/contour geometry and an active axis defining the tool orientation, which is required to produce the output. The input CAD file includes a layout sketch of the bottom centerlines of each support and diagonal required in the eggcrate substructure design. "Stayout area solids" may also be present in the input model to represent other non-eggcrate substructure features, such as forklift tubes and lift rings, that may become part of the overall tool design and affect how supports and diagonals are created. The sketch allows the designer to control how the tool is engineered for size, stress, and weight and other factors. By keeping the input CAD geometry simple, the designer can concentrate on engineering factors and avoid the tedious work of creating all the detailed CAD geometry.

Along with the input sketch the designer selects a set of variables to toggle and control the shape and size of features and how the CAD output will be formatted. The design engineer simply sketches a line representing the support location that represents the approximate length at the desired height and, if desired, adds a plane that passes thru the line to control the support orientation. No other geometry creation is needed.

Figure 15:
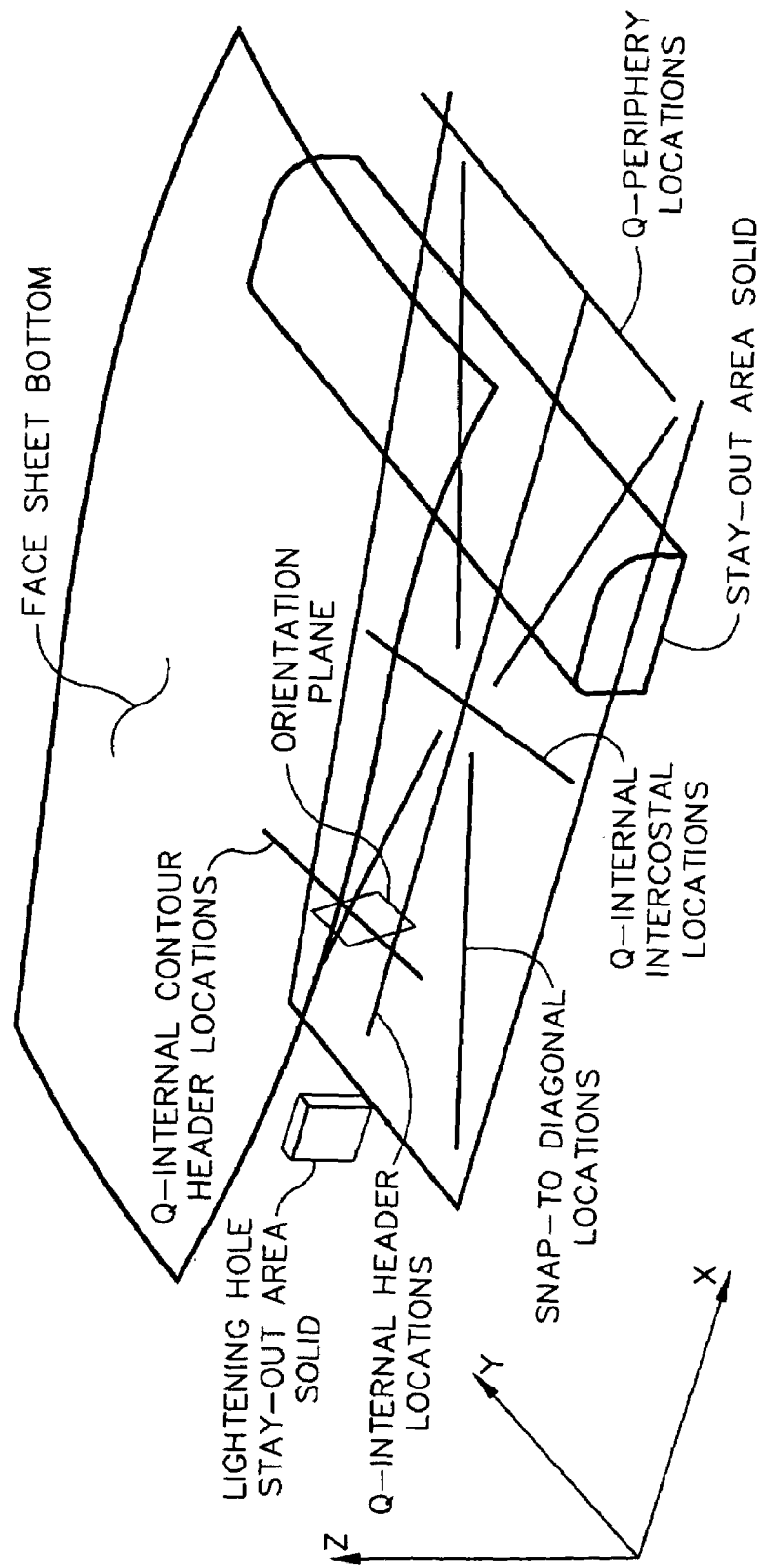
FIG. 15 is a perspective of an exemplary input model according to one embodiment consistent with the present invention.

Once the input model (see FIG. 15) is created, and the user is ready to generate the output model. The user can obtain the output model by launching the program or running the program in batch mode by going to the web launch start page. If the generated output model (see FIGS. 16A, 16B, 20A and 20B) is acceptable, the output can be used for tool design. If not, changes can be made to the input model and the program re-launched.

In the system architecture consistent with the present invention, the user utilizes a data processing system such as a personal computer (PC) 10 (see FIG. 1), and may use an internet 11 or intranet connection in order to launch the program from a server 12. Display means are used to provide the user with a choice of inputs to prepare the model. The program runs in memory on the PC, server or in a distributed system, which allows end-users and system designers/analysts to interact with the tool to rapidly design, modify, and/or test and validate the embedded application software.

For example, in a client-server arrangement, a client computer system and server computer system would each be connected to a network, such as a Local Area Network, Wide Area Network, or the Internet. Some or all of the code or data can be stored on either the client or the server computer system, and some or all of the steps of the processes can be carried out on the server computer system, which is accessed by the client computer system over the network. The present invention may also be implemented in a distributed system environment.

Further, although aspects of one implementation are depicted as being stored in memory, one of ordinary skill in the art would appreciate that all or part of the systems and method consistent with the present invention may be stored on or read from other computer-readable media, such as secondary storage devices, like hard disks, floppy disks, and CD-ROM; a carrier wave received from a network such as the Internet; or other forms of ROM or RAM. Further, one of ordinary skill in the art would appreciate that generic embedded technology architecture suitable for use with methods, systems, and articles of manufacture consistent with the present invention may contain additional or different components.

Figure 2:
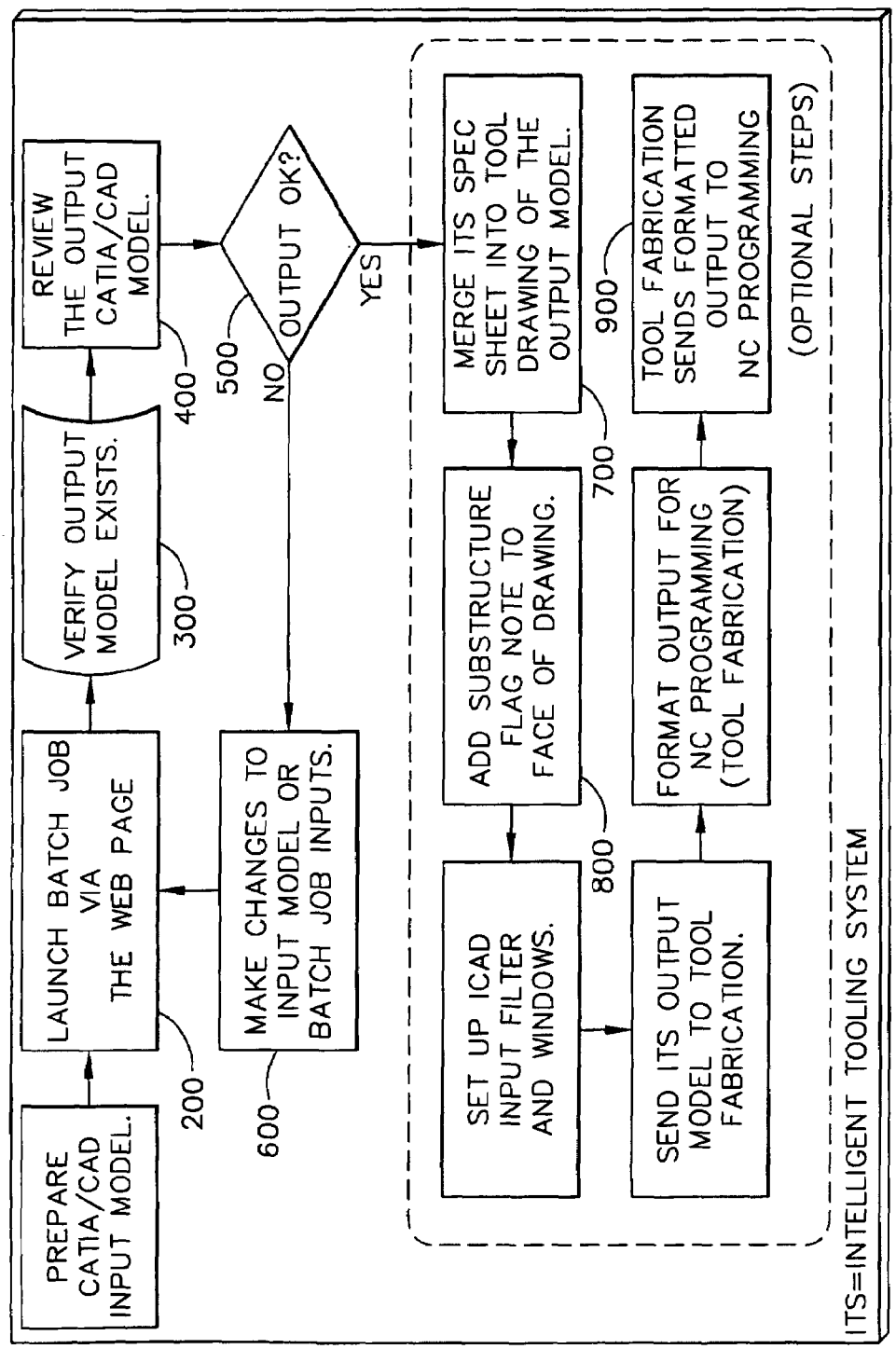
FIG. 2 is a flow chart of an overall process flow for a tier I flow of an application of creating a sketch-based eggcrate substructure for manufacturing composite parts according to one embodiment consistent with the present invention.

FIG. 2 shows the overall process flow for the application of creating a sketch-based eggcrate substructure for manufacturing composite parts. As stated previously, the CAD input file/model is created and prepared prior to accessing the program interactively or via the web launch page.

Figure 3:
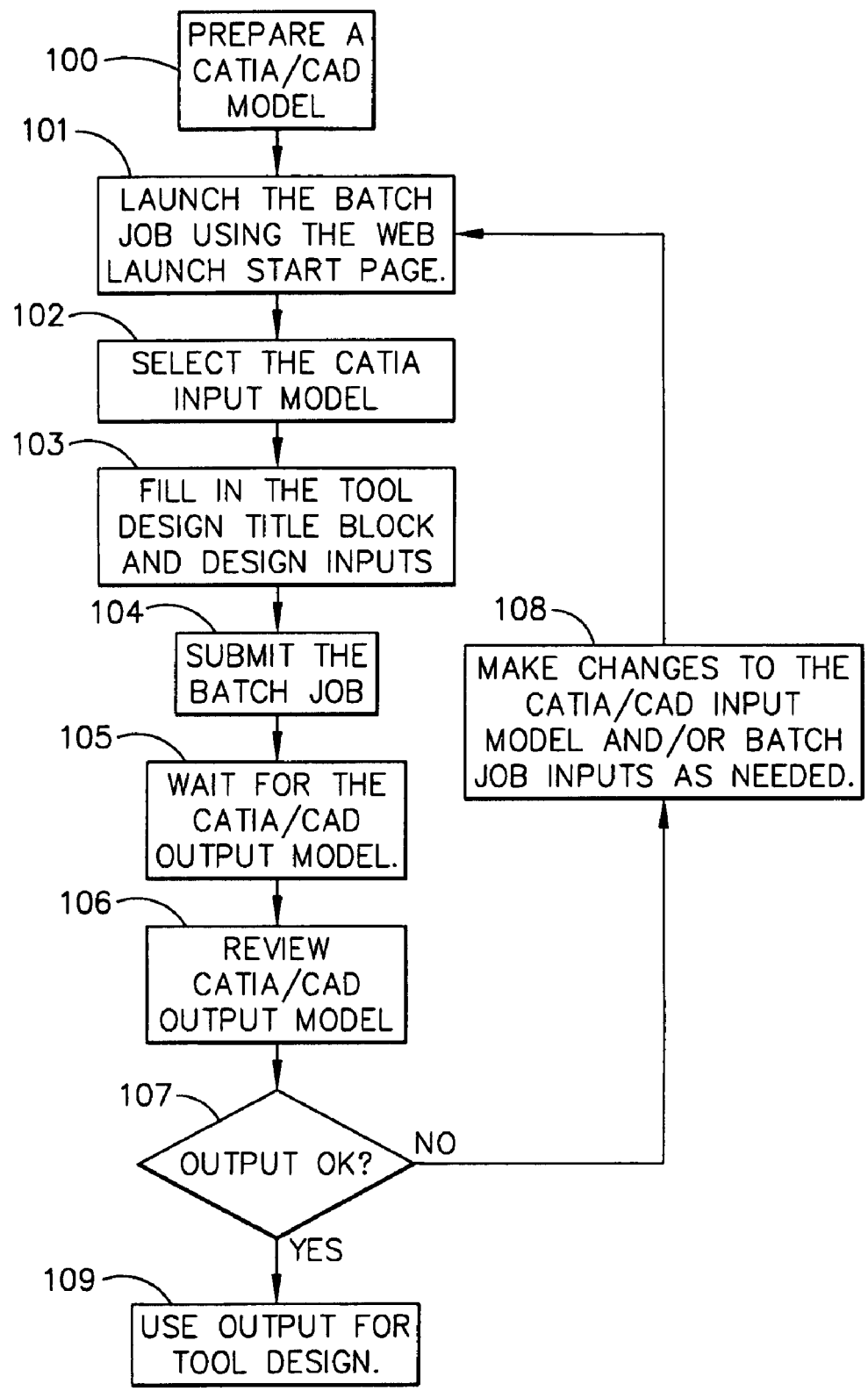
FIG. 3 is a flow chart of steps involved in launching and running an application as a batch job from a web browser according to one embodiment consistent with the methods and system of the present invention.

With respect to the first process step S100 (see FIG. 3) of preparing a CATIA model, the user first accesses the CAD program to define the input sketch.

Figure 4:
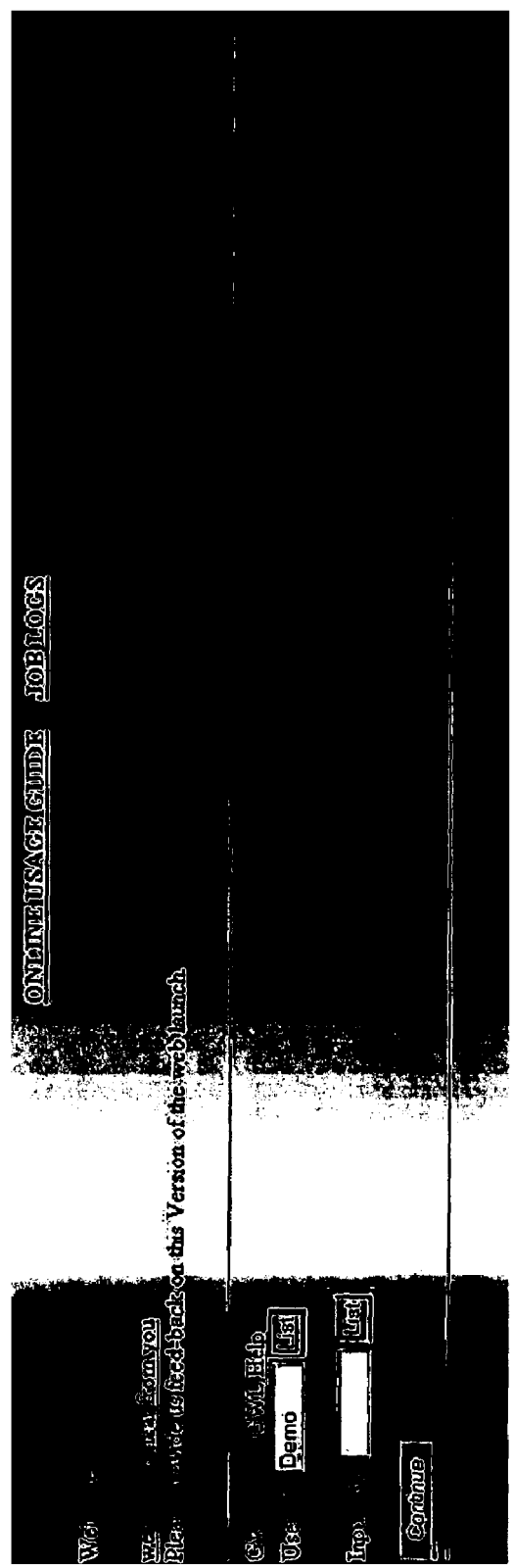
FIG. 4 is a screen shot of a Web Launch Start Page for a computer software program for creating a sketch-based eggcrate substructure for manufacturing composite parts according to one embodiment consistent with the present invention.

To launch the eggcrate tool in step S101, the program presents the user with, for example, a web launch start page (see FIG. 4) on the user's display means or monitor, requesting web launch administrative information, which the user must complete.

Figure 5:
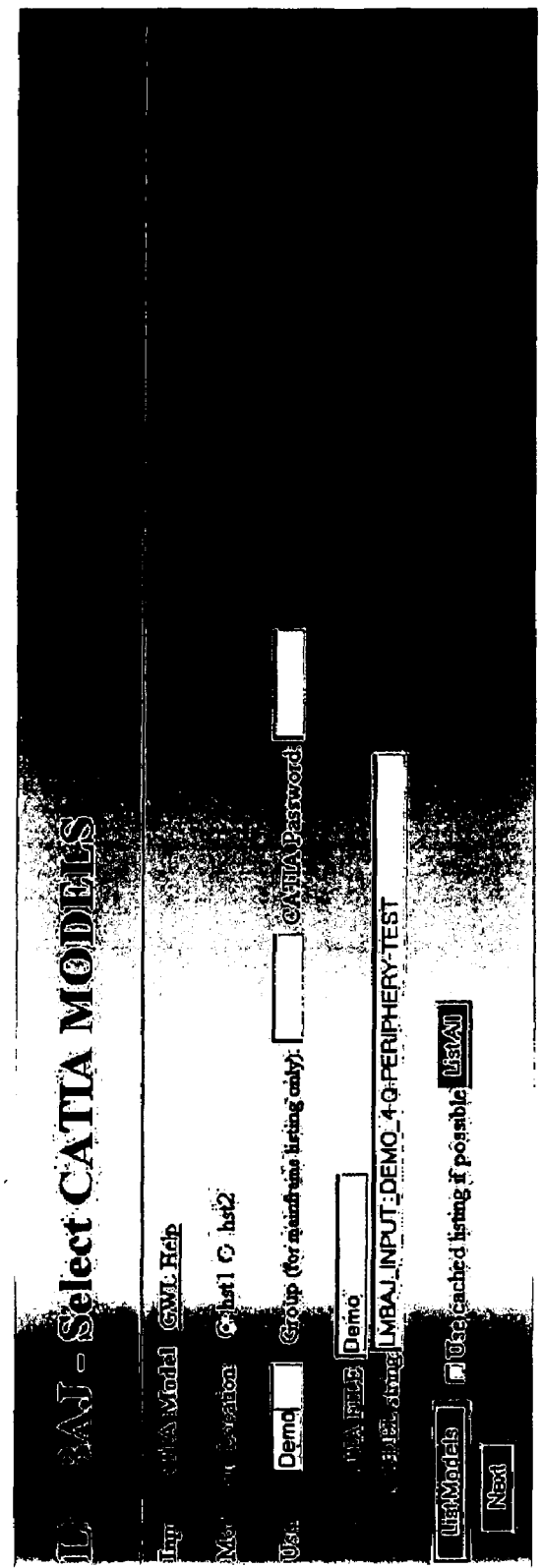
FIG. 5 depicts a screen shot of a Web Launch Page for selecting a CATIA input model of the computer software program for creating a sketch-based eggcrate substructure for manufacturing composite parts according to one embodiment consistent with the present invention.

Next the user is provided in S102 with, for example, a CATIA Model Input form (see FIG. 5) on the user's display means or monitor, requesting an input CATIA model to use.

Figure 6:
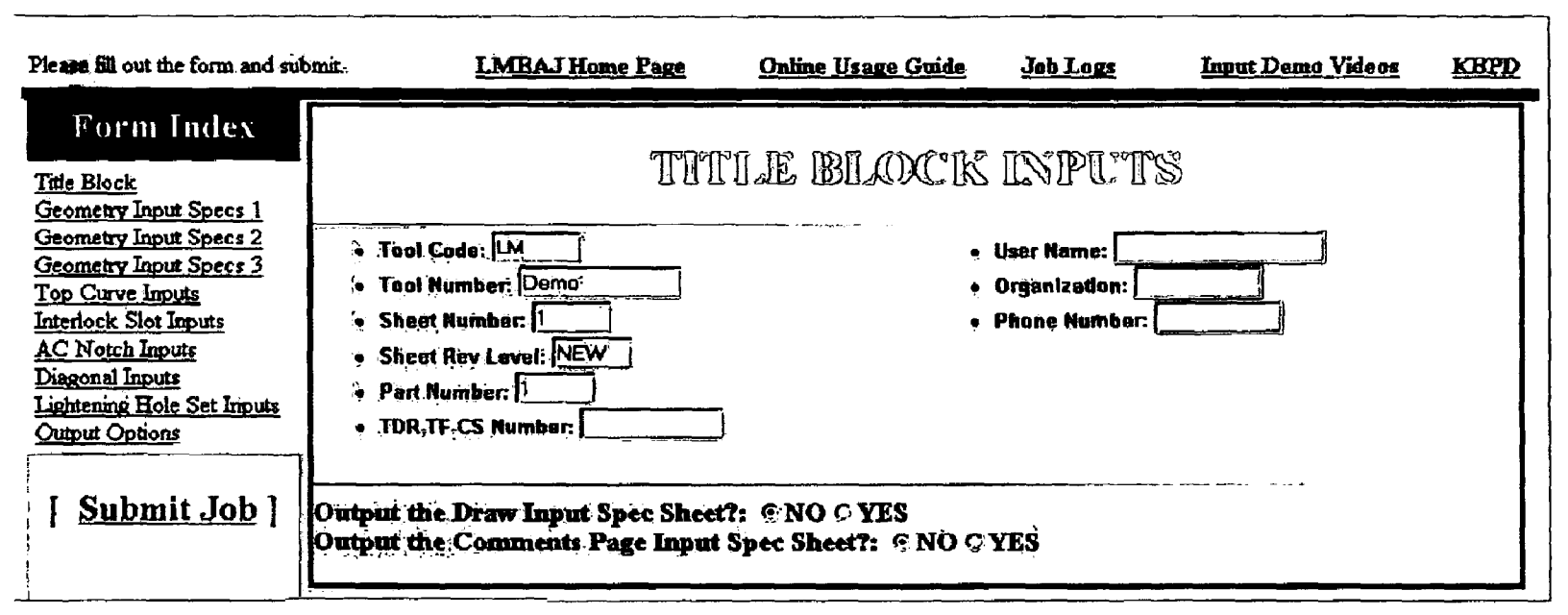

Then, the user is provided in S103 with a Form Index menu and Title Block input form (see FIG. 6), for example, which the program displays on the user's monitor, and which provides various inputs from which the user can choose. The user then chooses from among a variety of input sets listed in the Form Index, such as Title Block, Geometry Input Specs, Top Curve Inputs, Interlock Slots, AC (Air Circulation) Notch Inputs, Diagonal Inputs, Lightening Hole Set Inputs, and Output Options, for example.

Once the user chooses one of the input sets, the program will provide the user with a input form related to each chosen input set in step S103 such that the user may select from the various input sets to define the eggcrate tool (although, in one embodiment consistent with the present invention, some items will be automatically preset at default values and not requested from the user).

To launch the batch job in step S104 when the user has completed the various inputs, the user can then, for example, select the Submit form from the Form Index requesting output and launch information and submit the batch job to the server.

In the present invention, the following inputs are provided in menu form to the user and the user selects and enters the desired inputs to create the output CAD model for the desired CAD system (i.e., CATIA, UG, and even in universal standard CAD transfer file format like IGES).

Geometry Input Specs:

Geometry input specs are a way of describing to the application which input CAD model elements to use as input. They group together the geometric elements in the 3D CAD sketch representing a set of supports of a given type, a set of diagonals of a given type, both Stay-Out area Solids and Lightening Hole Stay-out Area Solids, and a set of surfaces and/or faces representing the bottom of the tool face sheet. Each spec could also contain the inputs used to generate the main item in the spec, such as thickness, overhang distance, interlock slot clearance, etc.

The CAD input model should only contain input geometry (the 3D sketch) used by the application to generate the eggcrate supports. Any other miscellaneous geometry in the file will slow down the translation time and might cause errors resulting in no output.

By using simple LISP forms as input specs, the application can obtain the proper geometry for each input set. This removes any stringent requirements for setting up the input CAD model, allowing the designer more flexibility on how they layout and configure geometry within the CAD model.

When the user submits the batch job, the web launch page creates the geometry input specs using the input form fields on the web pages. Then the web page script will submit the batch job with the formatted inputs to the server. Running the application interactively, the user can directly change each input spec as desired.

Each input spec form might have one or more keywords followed by a keyword entry. The keyword entry may be another keyword, list of keywords or a string (see examples below). In operation, the user accesses the menu for each keyword or keyword entry, and selects the keyword or string desired (see FIGS. 6–9). The program will use these inputs to create eggcrate geometry to place in the output CAD file.

Keyword Entry:

:TYPE—a keyword or list of keywords specifying the type(s) of CAD entities to be selected. Some valid entries include: :point, :line, :plane, :arc, :circle, :parametric-surface, :face, :planar-face, :parametric-spline. Examples include: :type :line, :type (:line :plane).

:COLOR—a keyword or list of keywords specifying the type(s) of CAD entities to be selected. Some valid entries include: :red, :yellow, :green, :blue, :cyan, :magenta, :black, :white. Examples include: :color :blue, :color (:red :blue).

:LAYER—a string specifying the layer or layers using the same format as in CATIA (i.e., a single number; a comma separated list; a range, specified by two numbers separated by a hyphen "20–30"; or any combination of these formats. Some valid entries include: a string. Examples include: :layer 20, :layer 20, 30, 40, :layer 0–5, 15, 20–30, 221.

:FONT—a keyword or list of keywords specifying the line font(s) of CAD entities to be selected. Some valid entries include: :solid, :dashed. Examples include: :font :solid, :font (:solid :dashed).

:IDENTIFIER—a string specifying the EXACT identifier the entity must have to be selected. Note that in a CATIA input file, each entity has a unique identifier. Therefore, this filter will only return a single entity, unless the :logical-or? Keyword (see below) is non-nil, and other filters are specified. Note also if :logical-or? is nil, AND other filters are specified, then the entity with the specified identifier must also meet the other filter criteria in order to be selected. This filter is not case sensitive since the CATIA data is all upper case. Some valid entries include: a string. Examples include: :identifier "centerline", :identifier "ORIGIN PT".

:ID-SUBSTRING—a string specifying a substring to be searched for in the entities :identifier string. All entities whose :identifier string contains the specified string will be selected. Some valid entries include: a string. Examples include: "id-substring "112A", :id-substring "LOWER".

:LOGICAL-OR?—defaults to nil. If this keyword is non-nil, then ALL of the entities selected by all of the specified filter keywords are "or"-ed together rather than being "and"-ed together. In other words, all of the entities meeting any of the specified filter criteria will be returned. Some valid entries include: R or NIL. Examples include: :LOGICAL-OR? T, :LOGICAL-OR? NIL.

Input Model Descriptions:

The following are descriptions of the input forms the user can select from a web page menu to define the input model specs and application inputs (see FIG. 7):

Default Layer Offset: (integer). The default number of layers to move from the support solid layer to the support wireframe layer. This is applied to all supports. Default value: 0.

Offset Layer: (integer). The number of layers to move the support wireframe geometry from its solid layer. This input is supplied for each support type and will override the default layer offset input. Default value: 0.

Geometry Inputs Specs 1:

Top Surface Parts: (spec). A spec describing which elements in the input model to use as inputs to define the bottom contour of the tool face sheet. Note: CATIA Skin and Volume entities are decomposed into their component Face entities before being transferred to the ICAD. Default value: none.

Q-Periphery Locations: (spec). A spec describing which elements in the input model to use as inputs to define where periphery supports are desired and how they are orientated. Lines and optionally planes, for an orientation other than vertical, may be used. Lines are matched up with their corresponding planes by finding the first plane collected by the spec to pass through a given line. These lines represent the location of the inside edge of each Q-Periphery support and should from a series of line segments. The series does not have to be closed. These lines only represent the approximate length of the final support. The final location and length are solved using the application "Q-Periphery Generation" algorithm and are used to create BLOCs (Bottom Location objects) representing the final support thickness, length, location and orientation. Default value: none.

Q-Internal Header Locations: (spec). A spec describing which elements in the input model to use as inputs to define where internal header supports are desired and how they are orientated. Lines and optionally planes, for an orientation other than vertical, may be used. Lines are matched up with their corresponding planes by finding the first plane collected by the spec to pass through a given line. These lines only represent the approximate length of the final support bottom edge centerline and are used to create BLOCs representing the final support thickness, length, location and orientation. Default value: none.

Q-Internal Intercostal Locations: (spec). A spec describing which elements in the input model to use as inputs to define where internal intercostal supports are desired and how they are orientated. Lines and optionally planes, for an orientation other than vertical, may be used. Lines are matched up with their corresponding planes by finding the first plane collected by the spec to pass through a given line. These lines only represent the approximate length of the final support bottom edge centerline and are used to create BLOCs representing the final support thickness, length, location and orientation. Default value: none.

Q-Chris Bee (Contoured Bottom) Internal Header Locations: (spec). A spec describing which elements in the input model to use as inputs to define where Chris Bee internal header supports are desired and how they are orientated. Lines and optionally planes, for an orientation other than vertical, may be used. Lines are matched up with their corresponding planes by finding the first plane collected by the spec to pass through a given line. These lines only represent the approximate final support bottom edge centerline and are used to create BLOCs representing the final support thickness, length, location and orientation. Default value: none.

Q-Chris Bee Internal Intercostal Locations: (spec). A spec describing which elements in the input model to use as inputs to define where Chris Bee internal intercostal supports are desired and how they are orientated. Lines and optionally planes, for an orientation other than vertical, may be used. Lines are matched up with their corresponding planes by finding the first plane collected by the spec to pass through a given line. These lines only represent the approximate length of the final support bottom edge centerline and are used to create BLOCs representing the final support thickness, length, location and orientation. Default value: none.

Geometry Inputs Specs 2:

Q-Bottom Stiffener Intercostal Locations: (spec). A spec describing which elements in the input model to use as inputs to define where bottom stiffener intercostal supports are desired and how they are orientated. Lines and optionally planes, for an orientation other than vertical, may be used. Lines are matched up with their corresponding planes by finding the first plane collected by the spec to pass through a given line. These lines only represent the approximate length of the final support bottom edge centerline and are used to create BLOCs representing the final support thickness, length, location and orientation. Other inputs include thickness, height, periphery overhang and corner fillet radius. Default value: none.

Contour Seam Support Locations: (spec). A spec describing which elements in the input model to use as inputs to define where contour seam supports are desired and how they are orientated. Lines and optionally planes, for an orientation other than vertical, may be used. Lines are matched up with their corresponding planes by finding the first plane collected by the spec to pass through a given line. These lines represent the exact length and location of the final support bottom edge centerline and are used to create BLOCs representing the final support thickness, length, location and orientation.

Diagonal Chris Bee Intercostal Locations: (spec). A spec describing which elements in the input model to use as inputs to define where diagonal Chris Bee intercostal supports are desired. Lines may only be used. These lines only represent the approximate location and length of the final support bottom edge centerline. The final location and length are solved using the application "snap-to diagonal" algorithm. These solved lines are used to create BLOCs representing the final support thickness, length, location and orientation. Default value: none.

Diagonal Interior Intercostal Locations: (spec). A spec describing which elements in the input model to use as inputs to define where diagonal interior intercostal supports are desired. Lines may only be used. These lines only represent the approximate location and length of the final support bottom edge centerline. The final location and length are solved using the application "snap-to diagonal" algorithm. These solved lines are used to create BLOCs representing the final support thickness, length, location and orientation. Default value: none.

Snap to Diagonal Locations: (spec). A spec describing which elements in the input model to use as inputs to define where snap-to diagonals are desired. The bottom centerlines do not have to be in an exact location. Snap-to diagonals are "smart" and each end will snap to into the nearest corner or the nearest face. Valid types: line. Default value: none.

Diagonal Locations: (spec). A spec describing which elements in the input model to use as inputs to define where diagonals are desired. These are simple diagonals. No snapping will take place. A simple box solid will be created on top of the bottom centerline. Valid types: :line. Default value: none.

Stayout Area Solids: (spec) A spec describing which elements in the input model to use as stayout area solids. These solids affect all of the supports that they are near to. For each support that is within the given stayout area clearance a subtraction will be made to make a clearance cutout in the support. These clearance cutouts are then passed on as Lightening hole stayout area solids. Valid types: solid (Must be an extruded solid such as a box, cylinder, or planar profile extruded. Holes will be ignored) Default Value: none.

Lightening Hole Stayout Area Solids: (spec). A spec describing which elements in the input model to use as lightening hole stayout area solids. These solids affect all of the supports that they are near to. For each support that is within the given stayout area clearance the solid will be passed to that supports lightening holes as a stayout area. A subtraction will be made to make a clearance cutout in the lightening hole, in effect adding back material to the support. Valid types: solid. (Must be an extruded solid such as a box, cylinder, or planar profile extruded. Holes will be ignored.) Default value: none.

Geometry Inputs Specs 3:

Periphery Locations: (spec). A spec describing which elements in the input model to use as inputs to define where periphery supports are desired and how they are orientated. Lines and optionally planes, for an orientation other than vertical, may be used. Lines are matched up with their corresponding planes by finding the first plane collected by the spec to pass through a given line. These lines only represent the exact length and location of the final supports' bottom edge centerline and are used to create BLOCs representing the final support thickness, length, location and orientation. Default value: none.

Internal Header Locations: (spec). A spec describing which elements in the input model to use as inputs to define where internal header supports are desired and how they are orientated. Lines and optionally planes, for an orientation other than vertical, may be used. Lines are matched up with their corresponding planes by finding the first plane collected by the spec to pass through a given line. These lines only represent the exact length and location of the final support bottom edge centerline and are used to create BLOCs representing the final support thickness, length, location and orientation. Default value: none.

Internal Intercostal Locations: (spec). A spec describing which elements in the input model to use as inputs to define where internal intercostal supports are desired and how they are orientated. Lines and optionally planes, for an orientation other than vertical, may be used. Lines are matched up with their corresponding planes by finding the first plane collected by the spec to pass through a given line. These lines only represent the exact length and location of the final support bottom edge centerline and are used to create BLOCs representing the final support thickness, length, location and orientation. Default value: none.

Chris Bee-Internal Header Locations: (spec). A spec describing which elements in the input model to use as inputs to define where Chris Bee internal header supports are desired and how they are orientated. Lines and optionally planes, for an orientation other than vertical, may be used. Lines are matched up with their corresponding planes by finding the first plane collected by the spec to pass through a given line. These lines only represent the exact length and location of the final support bottom edge centerline and are used to create BLOCs representing the final support thickness, length, location and orientation. Default value: none.

Chris Bee-Internal Intercostal Locations: (spec). A spec describing which elements in the input model to use as inputs to define where Chris Bee internal intercostal supports are desired and how they are orientated. Lines and optionally planes, for an orientation other than vertical, may be used. Lines are matched up with their corresponding planes by finding the first plane collected by the spec to pass through a given line. These lines represent the exact length and location of the final support bottom edge centerline and are used to create BLOCs representing the final support thickness, length, location and orientation. Default value: none.

Bottom Stiffener Intercostal Locations: (spec). A spec describing which elements in the input model to use as inputs to define where bottom stiffener intercostal supports are desired and how they are orientated. Lines and optionally planes, for an orientation other than vertical, may be used. Lines are matched up with their corresponding planes by finding the first plane collected by the spec to pass through a given line. These lines represent the exact length and location of the final support bottom edge centerline and are used to create BLOCs representing the final support thickness, length, location and orientation. Default value: none.

Top Curve Inputs:

The Top Curve Inputs form contains inputs that control the creation of the top edge of a support.

Top Curve Creation Method: (keyword). This is the method to use to create the top curve. Default value: Projected-points. Available selections: Projected-points, Solids, Intersect Plane, Project Curve.

Number of X Projections: (integer). The quantity of top curve points taken across the width of a support at each sampling location. Default value: 2.

Approximate Spacing: (floating-point number). The top curve point sampling distance along a support length at which point(s) will be projected onto the face sheet. A smaller spacing will slow down the computation of the support top curve. Also too small or large a value could cause undesired results. Adjust this value based on the overall face sheet contour of the tool. Default value: 0.2.

Spacing Factor: (floating-point number). This value affects when more top curve sampling points are needed between each sampled section. If the 3D distance between two consecutive points is greater than the calculated spacing multiplied by the factor then more point sampling will occur. Large gaps that can not be filled are assumed to be straight line sections. Default value: 2.15.

Method: (keyword). This is the top curve definition method used when sampling top curve points. Default value: Projected-point. Available selections: Projected-point, Line-intersection.

Method Multiple?: (NIL or T). This input changes the top curve definition method to either return multiple points or just the closest point. Default value: NO, Available selections: NO/YES.

Basis Offset: (floating-point). Specifies the distance to offset the top curve. Default value: 0.0.

Smoothing Radius: (floating-point). Specifies the radius to use when smoothing the top curve. Default value: 0.0.

Create C2 type Top Curve?: (NIL or T). Specifies whether to create the top curve as a C2 curve. Default value: NO, Available selections: NO/YES.

Curve Fitting Tolerance: (floating-point). Specifies the curve fitting tolerance to use when creating a C2 type top curve. Default value: 0.005.

Degree: (integer). Specifies the degree of the C2 top curve. Default value: 3.

Interlock Slot Inputs:

The interlock slot inputs group contains inputs that control slots created in a support when it crosses another support.

Rounded corners?: (NIL or T). Controls whether the bottom corners of a slot will be rounded. Default Value: YES, Available Selections: NO/YES Slot to Slot Clearance: (floating-point number). The clearance distance between the bottoms of two interlocking slots. Default Value: 0.060.

Edge Clearance: (floating-point number). The clearance distance between a slots edge and the support passing through the slot. Angles other than 90 degrees are taken into account when interlock slots are being generated. Default Value: 0.030.

AC Notch Inputs:

Include Air Circulation Notches: (NIL or T). If the substructure requires air circulation notches, the user may select this option. Default value: Yes; Available Selections: No/Yes.

Air Circulation Notch Type: (keyword). Controls the type of air circulation notch. Default value: Filleted, Available sections: filleted, circular, fitted, single-castle, multi-castle.

Notches at Butt Joints? (NIL or T). Controls whether air circulation notches are placed at butt joints. Default value: YES. Available selections: NO/YES>.

Notches at Interlock Slot Joints? (NIL or T). Controls whether air circulation notches are placed at interlock slot joints. Default value: YES. Available selections: YES/NO.

Minimum Separation: (floating-point number). The minimum distance between notches along the supports top contour (see FIG. 7). Used to determine notch quantity. Default value: 2.0.

Minimum Notch-to-Notch: (floating-point). The minimum allowable distance between two adjacent notches. Default value: 1.70.

End Separation: (floating-point). The distance between the first or last notch in a set and the start or end of the notch set. A notch set is created for each section along the top of a support that is broken up by other supports crossing or butting up to the support.

Notch Depth: (floating-point). Specifies the distance to the bottom of the notch offset from the top curve. Default value: 2.00.

Max Notch Width: (floating-point). The maximum allowable width of and AC notch. For the circular-notch type this would be equal to the diameter of the notch. Default value: 4.500.

Min Notch Width: (floating-point). The minimum allowable width of an AC notch. For the circular-notch type this would be equal to the diameter of the notch. Default value: 2.500.

Notch Fillet Radius: (floating-point). The radius used for all fillets within any AC notch. This includes fillets other than at the two bottom corners added to a notch that required trimming based on the min-notch-to-notch-separation distance. Default value: 0.250.

Added Castle Bottom Width: (floating-point). The additional distance to add to the bottom width of a castle after widening to the minimum notch width when its basis bottom width is less then the minimum notch width. Default value: 0.10.

AC Multi Castle Max Qty: (integer|NIL). The maximum number of castles to create for each castle location span. Default value: NIL.

AC Multi Castle End Gap Factor: (floating-point). The ratio of the end notch width to the calculated notch with for a given castle location span along the top curve. Default value: 0.50.

Default Fit Factor: (floating-point). This input applies only to notches of type fitted-notch. Its value determines how the front and rear of the notch will be defined. These edges are defined by connecting the bottom and point edge point of intersection with the support top contour. The factor is used to position points used to build the edge curved. Default value: 0.60.

Bottom Fit Factor: (floating-point). This input applies only to notches of a type fitted-notch. Its value determines how the front and rear of the notch will be defined. These edges are defined by connecting the bottom and point edge point of intersection with the support top contour. The factor is used to size the bottom used to build the front and rear curves of the notch. Default value: 0.60.

Smooth Out AC Set Spacing Curve? (NIL or T). Controls whether the top curve used to locate and define the air circulation notches is smoothed. Default value: NO. Available selections: NO/YES.

Spacing Curve Smoothing Radius: (floating-point). The radius to use when smoothing the top curve used to locate and define air circulation notches. Default value: 0.50.

Check Front and Rear for Thin Area? (NIL or T). Controls whether to test the area in-front or behind the notch are too thin to support the notch. Default value: YES. Available selections: NO/YES.

Thin Test Offset Distance: (floating-point). The distance from the front and rear notch intersection points to offset along the top curve to check for thin areas. Default value: 0.25.

Thin Test Min Angle: (floating-point). The minimum angle allowed for thin areas. If the calculated angle is less than the minimum allowed thin test angle the notch is considered to be invalid and does not become a feature of the support. Default value: 30.0.

Check Area Test M4? (NIL or T). Controls whether a comparison between the notch basis area and the notch area after one end is trimmed is done to check for an invalid notch. Default value: YES. Available selections: NO/YES.

Area Test M4 Factor: (floating-point). The ration of the notch basis trimmed on one end to the notch basis area. If the calculated ratio is smaller than the input value the notch is considered to be invalid and does not become a feature of the support. Default value: 30.0.

Diagonal Inputs:

The diagonal inputs group contains inputs that control diagonal stiffeners created as part of the eggcrate substructure.

Thickness?: (floating-point) Specifies the thickness of a diagonal. Default Value: 0.250.

Height: (floating-point number) Specifies the height of a diagonal. Default Value: 4.00.

Same Diagonal Length Tolerance: (floating-point number) The tolerance to use when testing for diagonals of similar length. When a set of diagonals have the same length within this tolerance a detail of the shortest diagonal is created to represent the entire set of diagonals. Default Value: 0.030.

Interlock Slot Rounded Corners?: (NIL or T) Controls whether the bottom corners of a slot will be rounded. Default Value: YES, Available Selections: NO/YES Interlock Slot to Slot Clearance: (floating-point number) The clearance distance between the bottoms of two interlocking slots. Default Value: 0.060.

Interlock Slot Edge Clearance: (floating-point number) The clearance distance between a slots edge and the diagonal passing through the slot. Angles other than 90 degrees are taken into account when interlock slots are being generated. Default Value: 0.030.

Solving Tolerance: (floating-point number) Specifies the tolerance to use when solving for the position of a Snap-to-Diagonal part. Applies to Snap-to-Diagonals only. Default Value: 0.0005.

Use Second Algorithm?: (NIL or T) Controls which algorithm to use to solve for the position of a bottom corners of a Snap-to-Diagonal part. Applies to Snap-to-Diagonals only. Default Value: YES, Available Selections: NO/YES Maximum Number of Iterations: (integer) Specifies the maximum number of iterations to use to solve the position of a Snap-to-Diagonal part. Applies to Snap-to-Diagonals only. Default Value: 100.

Solving Length Clearance: (floating-point number) Specifies the distance to remove from each end the solved length of a Snap-to-Diagonal part. Applies to Snap-to-Diagonals only. Default Value: 0.0.

Stayout Area Added Clearance: (floating-point number) Specifies an additional distance to add to the stayout area where a Snap-to-Diagonal part front and rear edges contact a support. Applies to Snap-to-Diagonals only. Default Value: 0.0.

Lightening Hole Set Inputs:

The lightening hole inputs group contains inputs that control different aspects of each hole set and each individual hole.

Include Lightening Hole Features?: (NIL or T). Controls whether lightening holes are created or not. Default value: NO. Available selections: NO/YES.

Lightening Hole Type: (keyword). Controls the type of lightening hole to be created. Default value: blended rectangle. Available selections: blended rectangle, single truss, double truss.

Stacked Lightening Hole Features?: (NIL or T). Controls whether lightening holes are stacked or not based upon the input max hole height. Default value: Yes. Available selections: NO/YES.

Fillet Radius: (floating-point number). The blend radius to use when filleting lightening holes. Default value: 1.0.

Separation: (floating-point number). The distance between two lightening holes along the length of a support in a given lightening hole set. Default value: 2.15.

Stack Separation: (floating-point number). The distance between each lightening hole in a given stack. Default value: 2.0.

End Separation: (floating-point number). The clearance distance between the start or end of a lightening hole set and support feature such as an interlock slot or butt joint.

Base Edge Margin: (floating-point number). The distance between the bottom of the support and the lightening hole set. Default value: 2.0.

Top Edge Margin: (floating-point number). The distance between the top of the support or bottom of any AC Notches and the lightening hole set.

Max Hole Width: (floating-point number). Specifies the maximum width for any lightening hole. Default value: 12.0.

Min Hole Width: (floating-point number). Specifies the minimum width for any lightening hole. Default value: 6.0.

Max. Hole Height: (floating-point number). Specifies the maximum height for any lightening hole. Default value: 12.0.

Min. Hole Height: (floating-point number). Specifies the minimum height for any lightening hole. Default value: 6.0.

Use Unblended Holes?: (NIL or T). Controls whether lightening holes are blended/filleted. Default value: NO. Available selections: NO/YES.

Valid Hole Test Factor: (floating-point number). A factor used to determine whether to keep a lightening hole based upon its volume as compared to the volume of a cylinder made using the input fillet radius multiplied by the factor. If the volume of the hole is less than the test cylinder the hole is not used to define the support. Default value: 1.0.

Double Truss?: (NIL or T). Controls whether lightening holes are created and then divided by an "X" pattern truss. Default value: NO. Available selections: NO/YES.

Single Truss Pattern: (keyword). Controls the type of single truss pattern to use for a given lightening hole. Default value: Alternate-stack-and-subset. Available Selections: Alternate-stack-and subset; Alternate-subset; Alternate-stack.

Truss Width: (floating-point number). The thickness to make a lightening hole truss. Default value: 1.0.

Stayout Area Offset Distance: (floating-point number). The clearance distance between a lightening hole and a stayout area. Default value: 2.0.

Output Options:

The output options group contains inputs that control how the output geometry is formatted.

All Supports CATIA Output Method: (keyword) The method to use when outputting the geometry for each support. This input may not produce the desired result when outputting to a CAD system other than CATIA. Default Value: Inner Domain Solid, Available Selections: Inner Domain Solid, CSG Solid, Wireframe.

Solid Modeler Mode?: (keyword) The process mode to run ICAD solid modeler in. Default Value: in-memory, Available Selections: in-memory, Local.

Include Solved 3D Layout Sketch with Output?: (NIL or T) Controls whether to include with the output a detail containing the geometry of the solved 3D layout sketch. Default Value: NO, Available Selections: NO/YES CATIA v4 Output formatted for CATIA v5?: (NIL or T) Controls whether to format a CATIA v4 output file using details and dittos such that when transferred to CATIA v5 it produces a product structure tree of the eggcrate substructure. Default Value: NO, Available Selections: NO/YES Test for like Support for each Support Type?: (NIL or T) Controls whether to test for "like" supports within a group of supports of the same type. When two or more like supports are found the detail work space for the first like support is used to ditto all of the like supports. The algorithm for this test is not based on a support final geometric definition. But rather an intermediate creation step. This input is applied only when the input "CATIA v4 Output Formatted for CATIA v5?" is set to T and may not produce the desired result when outputting to a CAD system other than CATIA. Default Value: NO, Available Selections: NO/YES Create a Sub-Assembly for each Support Type?: (NIL or T) Controls whether to create for each type of support used a nested detail workspace containing dittos of all of the supports of that type. This input is applied only when the input "CATIA v4 Output Formatted for CATIA v5?" is set to T and may not produce the desired result when outputting to a CAD system other than CATIA. Default Value: NO, Available Selections: NO/YES Create a Sub-Assembly for Diagonals?: (NIL or T) Controls whether to create a nested detail workspace containing dittos of all diagonals. This input is applied only when the input "CATIA v4 Output Formatted for CATIA v5?" is set to T and may not produce the desired result when outputting to a CAD system other than CATIA. Default Value: YES, Available Selections: NO/YES Support Sketch Location: (keyword) The location plane parallel to a zy-plane of a support to place the wireframe geometry on. This input is applied only when the input "CATIA v4 Output Formatted for CATIA v5?" is set to T and may not produce the desired result when outputting to a CAD system other than CATIA. Default Value: Left, Available Selections: Left, Right, and Centerline.

Diagonal Sketch Location: (keyword) The location plane parallel to a zy-plane of a diagonal to place the wireframe geometry on. This input is applied only when the input "CATIA v4 Output Formatted for CATIA v5?" is set to T and may not produce the desired result when outputting to a CAD system other than CATIA. Default Value: Left, Available Selections: Left, Right, and Centerline.

Output Supports As: (keyword) The method to use when outputting the geometry for each diagonal. This input is applied only when the input "CATIA v4 Output Formatted for CATIA v5?" is set to T and may not produce the desired result when outputting to a CAD system other than CATIA. Default Value: Inner Domain Solid, Available Selections: Inner Domain Solid, CSG Solid, and Wireframe.

Output Diagonals As: (keyword) The method to use when outputting the geometry for each diagonal. This input is applied only when the input "CATIA v4 Output Formatted for CATIA v5?" is set to T and may not produce the desired result when outputting to a CAD system other than CATIA. Default Value: Inner Domain Solid, Available Selections: Inner Domain Solid, CSG Solid, and Wireframe.

Q-Periphery Generation:

Q (quick) periphery generation is a method for defining the joints between each of the Q-periphery support locations from a 3D sketch of the inside edges of the periphery support locations. From these solved joints, periphery support bottom centerline locations can be created.

Figure 11:
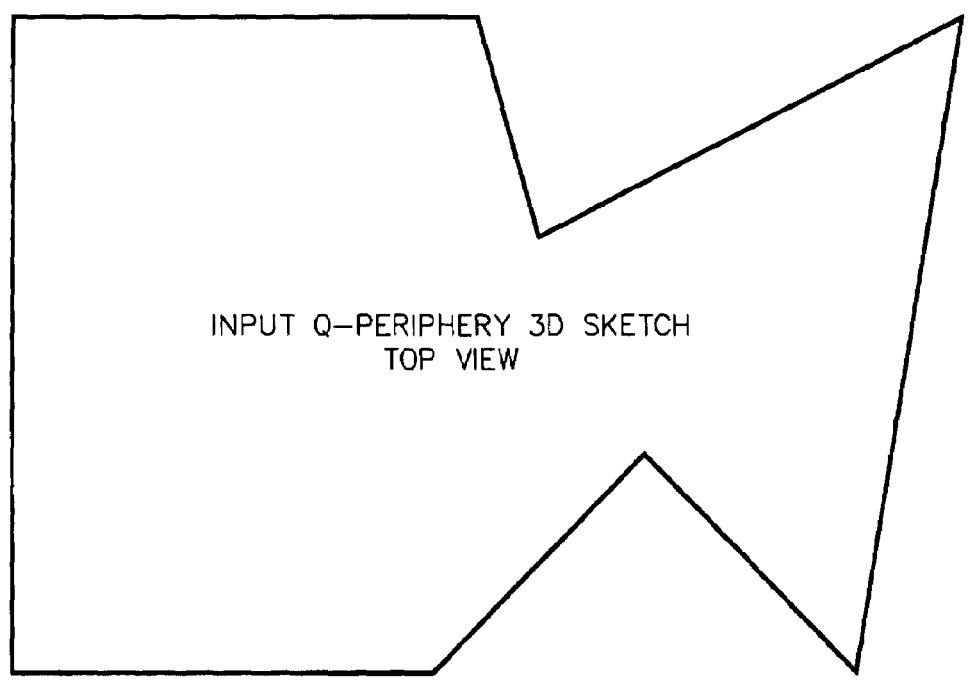
FIG. 11 is a plan of an example Q-Periphery three-dimensional input sketch showing the chained inside line segments according to one embodiment consistent with the present invention.
Figure 12:
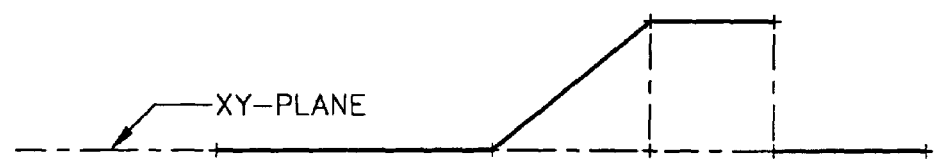
FIG. 12 is a elevation of an example of how the Q-periphery three-dimensional input sketch chained inside line segments need not lie on the xy plane according to one embodiment consistent with the present invention.

FIG. 11 shows a top view, for example, of a Q-periphery chain and how it can be used to quickly define the complex outer shape for an eggcrate substructure. FIG. 12 shows an elevation view (side view) showing how the Q-periphery chain segments do not have to lie on the xy plane. Thus, the location (both on the xy-plane and vertically), orientation, and approximate lengths of eggcrate substructure periphery supports may be quickly defined using a 3D sketch.

In the process rules consistent with the methods and system of the present invention:
  the inside edge is never penetrated/crossed when defining the joint between q-periphery elements (unless the percent overlap exceeds 100%).
  the inside edge intersection corner point does not move.
  the amount of overlap is based on a percentage of the thickness of the non-overlapping part.
  Q-periphery support lengths are adjusted along their respective centerlines to create the final Q-periphery joint.
  all Q-periphery inside edge elements must form a chain when projected onto the xy plane of the tool.
  the Q-periphery sketch does not have to be closed.
  only one Q-periphery sketch chain is used.
  Q-periphery supports may be of different thickness.
  the Q-Periphery sketch may not cross itself.

Figure 13A:
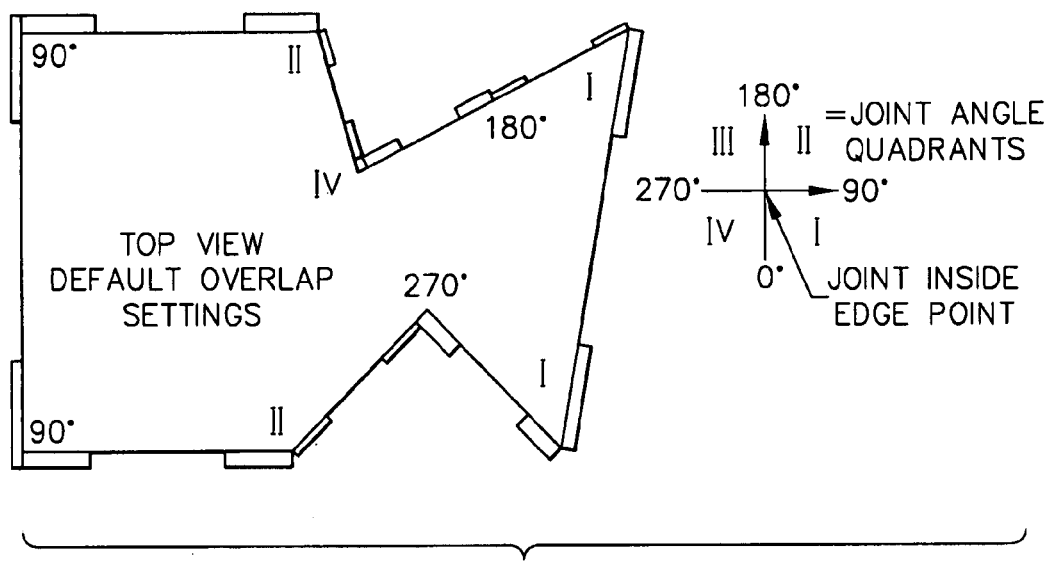
FIG. 13A (top view, default overlap settings) and FIG. 13B (top view, 50% overlap applied) are examples of resulting compound butt joints for different overlap values for a solved Q-Periphery Sketch according to one embodiment consistent with the present invention.
Figure 13B:
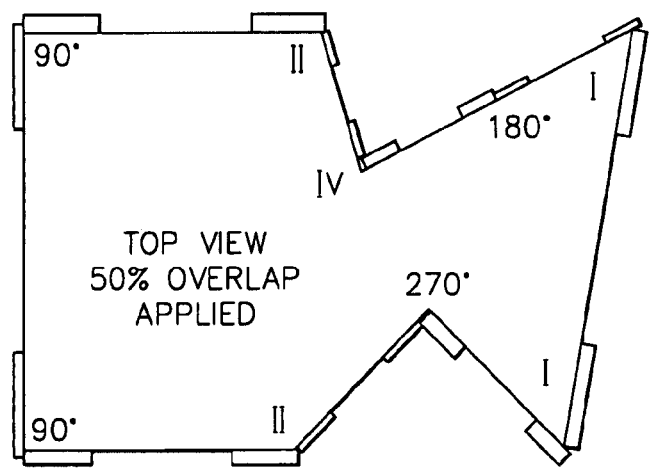

FIG. 13A (top view, default overlap settings) and FIG. 13B (top view, 50% overlap applied) are examples showing the resulting compound butt joints for different overlap values.

The input CAD lines represent the bottom inside edge of each periphery support. From each given line a new bottom centerline is created that has its length based on the corner joints between periphery inside edges.

In other input process steps, the following are followed when solving for Q-Periphery bottom centerline locations:
  query for Q-periphery inside bottom edge locations from input model.
  chain bottom inside lines such that the end on one segment is the start of the next segment when projected onto the xy-plane.
  re-chain bottom inside lines so that their x-axis vector points inward and y-axis vector to the next start of a line.
  create a Q-periphery joint object at each vertex on the chain that has two lines.
  solve each joint based on the process rules.
  create periphery bottom centerline objects between the joints using attributes from the solved start and end joints for each input Q-periphery location.

The Q-periphery joint inputs and rules are as follows:
  Inputs:
    :quadrant-type-tolerance 0.0001
    :overlap-selection-vector (the (:face-normal-vector :right)) of a joint—determines which input line/support will overlap the other when they form a 90 or 270 degree joint.
    :default-overlap-percentage 0.05;; (percent 0) to (percent 100) or 0 to 1 or nil
    :quadrant-1-overlap-percentage (the :default-overlap-percentage)
    :quadrant-2-overlap-percentage (the :default-overlap-percentage)
    :quadrant-3-overlap-percentage (the :default-overlap-percentage)
    :quadrant-4-overlap-percentage (the :default-overlap-percentage)
    overlap-percentage-at 90 (the :default-overlap-percentage)
    overlap-percentage-at 270 (the :default-overlap-percentage)

Figure 16A:
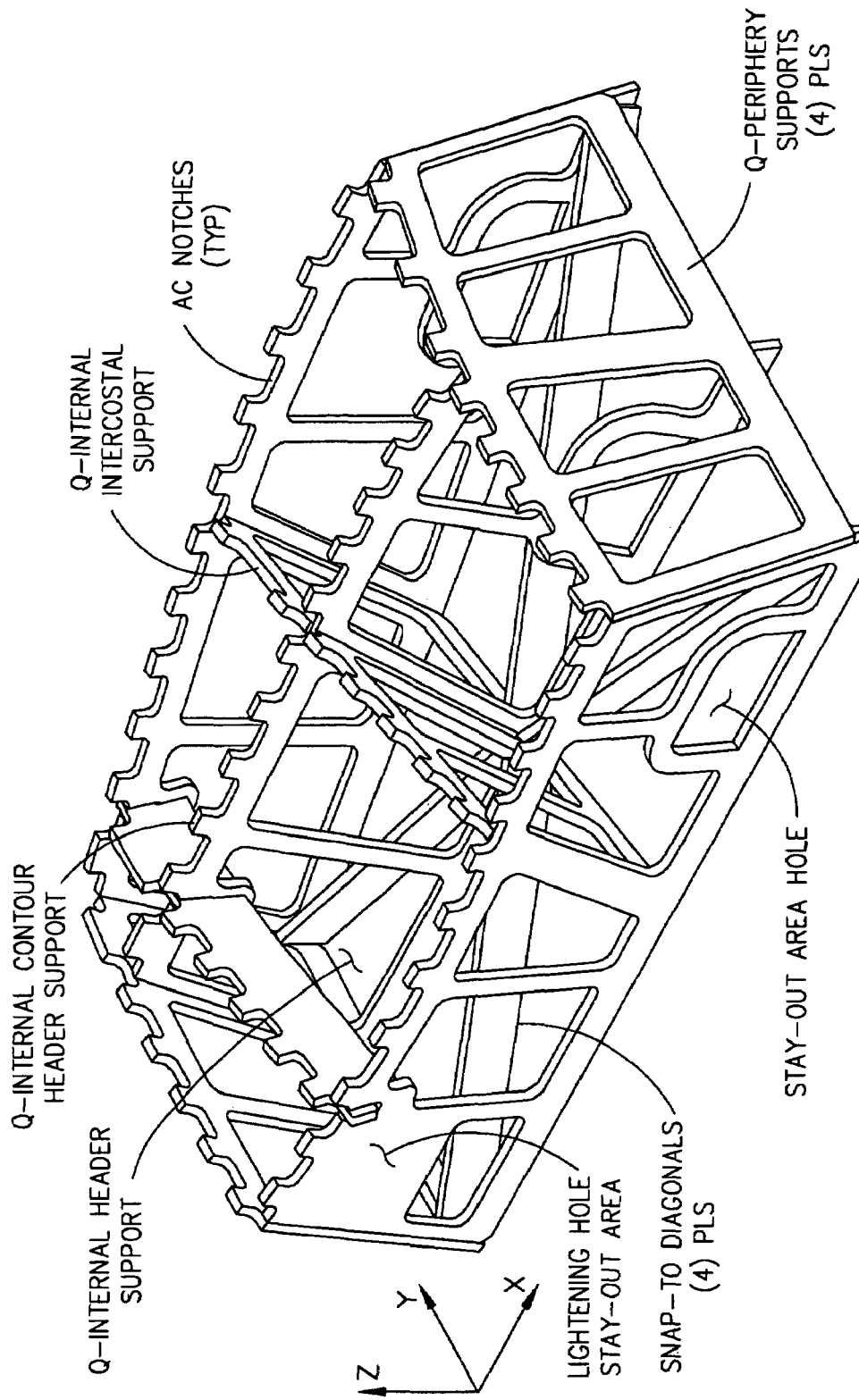
FIG. 16A (perspective of a three-dimensional space geometry) and FIG. 16B (two-dimensional draw output) are exemplary views of an output model for review by the user according to one embodiment consistent with the present invention.
Figure 17:
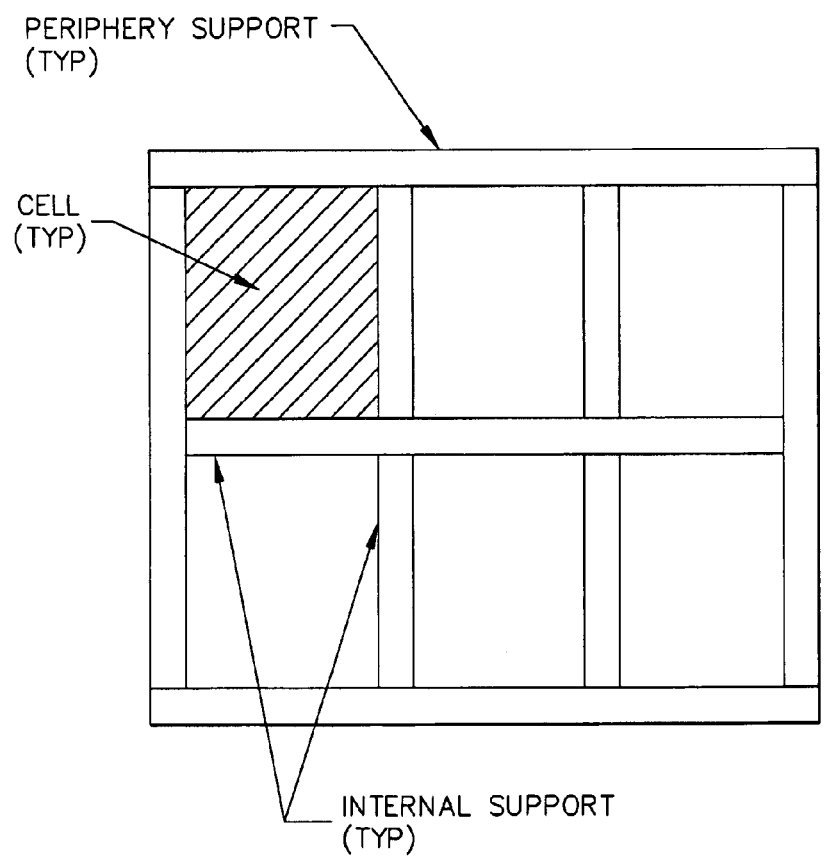
FIG. 17 is a plan of an exemplary eggcrate substructure showing how cells are formed by periphery and internal supports according to one embodiment consistent with the present invention.
Figure 18:
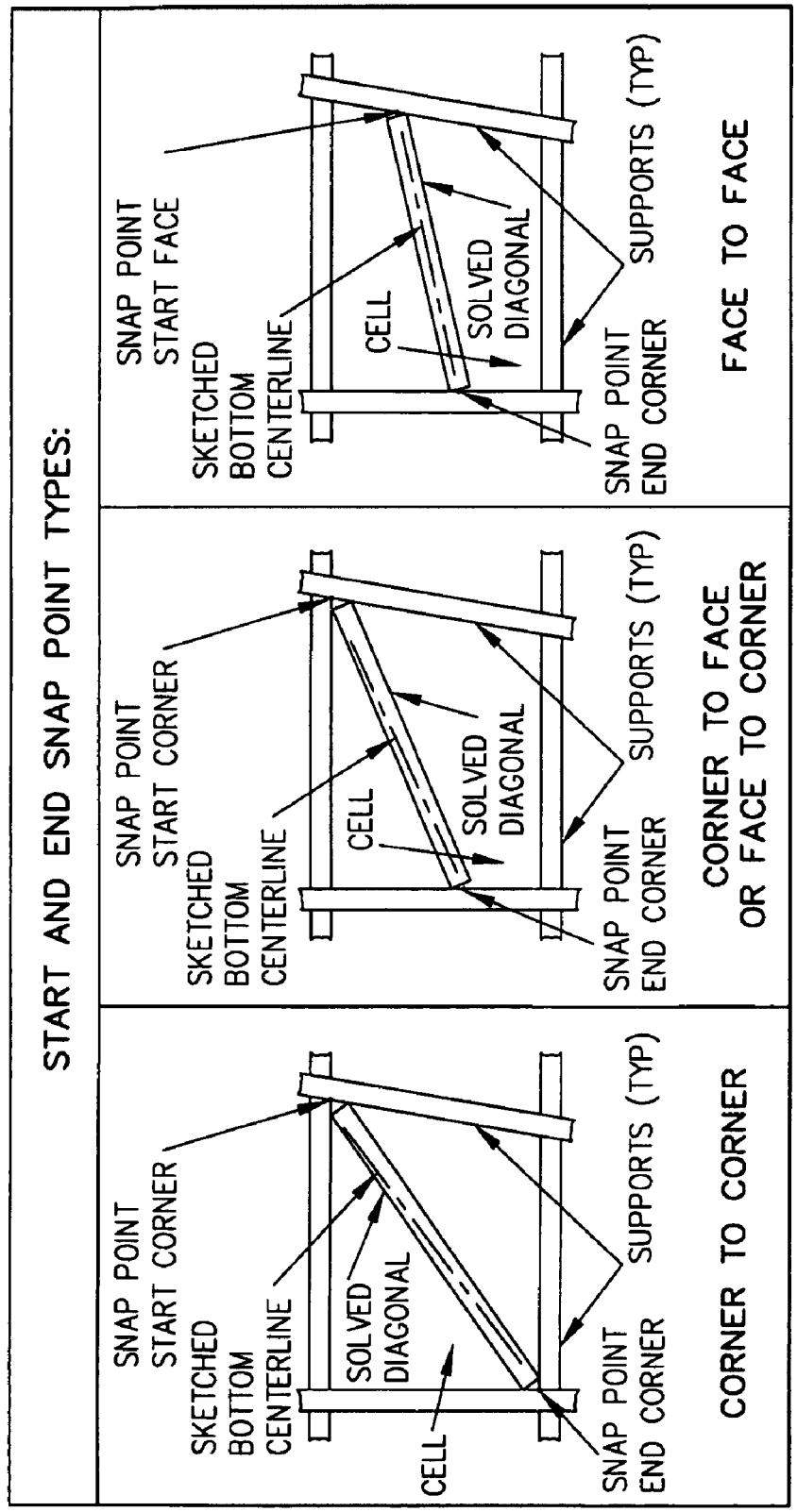
FIG. 18 is a table of exemplary views of the three different conditions possible for a Snap-to Diagonal start and end snap-to points according to one embodiment consistent with the present invention.

Snap-to and Generic Diagonals:

Diagonals are cross braces for the substructure (see FIG. 16A). They are usually placed such that each end of the diagonal fits inside opposing corners of an eggcrate substructure cell (see FIGS. 17 and 18). When the two opposing corners do not form a square the centerline from one corner to the other will not match the centerline of rectangle (diagonal) fitted between the two corners (see FIG. 18). Thus, solving for the centerline of the fitted diagonal would take considerable time and effort by the tool designer using standard CAD functionality.

The Snap-to Diagonals algorithm allows a user to simply sketch input bottom centerlines that are the approximate length and location of the diagonal. The application Snap-to Diagonal algorithm will use this approximate bottom centerline and other eggcrate objects near its start and end points to solve (i.e., snap-to) for its intended location, length and orientation.

In the Snap-to Diagonal process rules consistent with the methods and system of the present invention:
- both supports and stay-out area solids are considered as objects to snap to.
- two crossing diagonals may be created within a cell and at their intersection interlock slots will be created
- the difference between the two distances from a sketched centerline end or start point of a Snap-to Diagonal and the two closest valid objects to snap to is used to determine whether to snap that end to the corner formed by the objects or to the face of the closest object.

In other input process steps, the following are followed when solving for Snap-to Diagonals locations:
- query for Snap-to Diagonal bottom centerline locations from input model.
- determine the two valid snap-to objects closest to each end of the centerline. Valid snap-to objects are defined using the snap-point inputs :nearest-supports-test-distance and :nearest-supports-test-height.
- determine the type of end condition for the start and end snap-points of a bottom centerline end of a Snap-to Diagonal. See FIG. 17 for table of the possible snap-point types.
- solve for the intended length, location and orientation of each Snap-to Diagonal based on the snap-point types.
- create the solved diagonal bottom centerline objects.

Generic diagonals are created without any regard to surrounding supports or stayout area solids. Their location, length and orientation are set by the input bottom centerline CAD element.

In other diagonal generation process rules consistent with the methods and system of the present invention:
- diagonals do not accommodate stay-out areas.
- Snap-to Diagonals may cause errors when snapped to object faces that are angled (i.e., supports with orientation planes other than 90° to the tool xy-plane). The resulting diagonal will not have angled start and end faces and may interfere with the snap to objects.
- Snap-to-diagonals and generic diagonals may intersect. Interlock slots will be created at the joint.
- for all diagonals without interlock slots, a CATIA detail will be created from the diagonal of the shortest length for sets of diagonals of lengths within the same-diagonal length-tolerance. CATIA dittos for each diagonal will then be created in the CAD model.
- for Snap-to Diagonals, lightening hole stay-out areas are created at all butt joint locations (i.e., at the two ends of the diagonal).

CAD Input Model:

Thus, the input model (see FIG. 15) rules for building a 3D CAD sketch representing the inside edge of the substructure periphery, include:
- the line segments do not have to lie on the same plane.
- the start and end point of each line may be in different planes.
- the line segments may form an open chain when viewed along the tool z-axis vector (top view).
- each line segment may also have a corresponding plane in which the line lies and is used to define the z-axis of the support. This plane can not be parallel to the xy plane.

Further, the CAD input model must contain the following geometry elements:
1) One local and active tool axis. This axis provides the orientation of the tool, supports and diagonals.
2) One or more surfaces and or faces modeling the bottom of the tool face sheet. These faces will be used to define the top of the supports.

Figure 19:
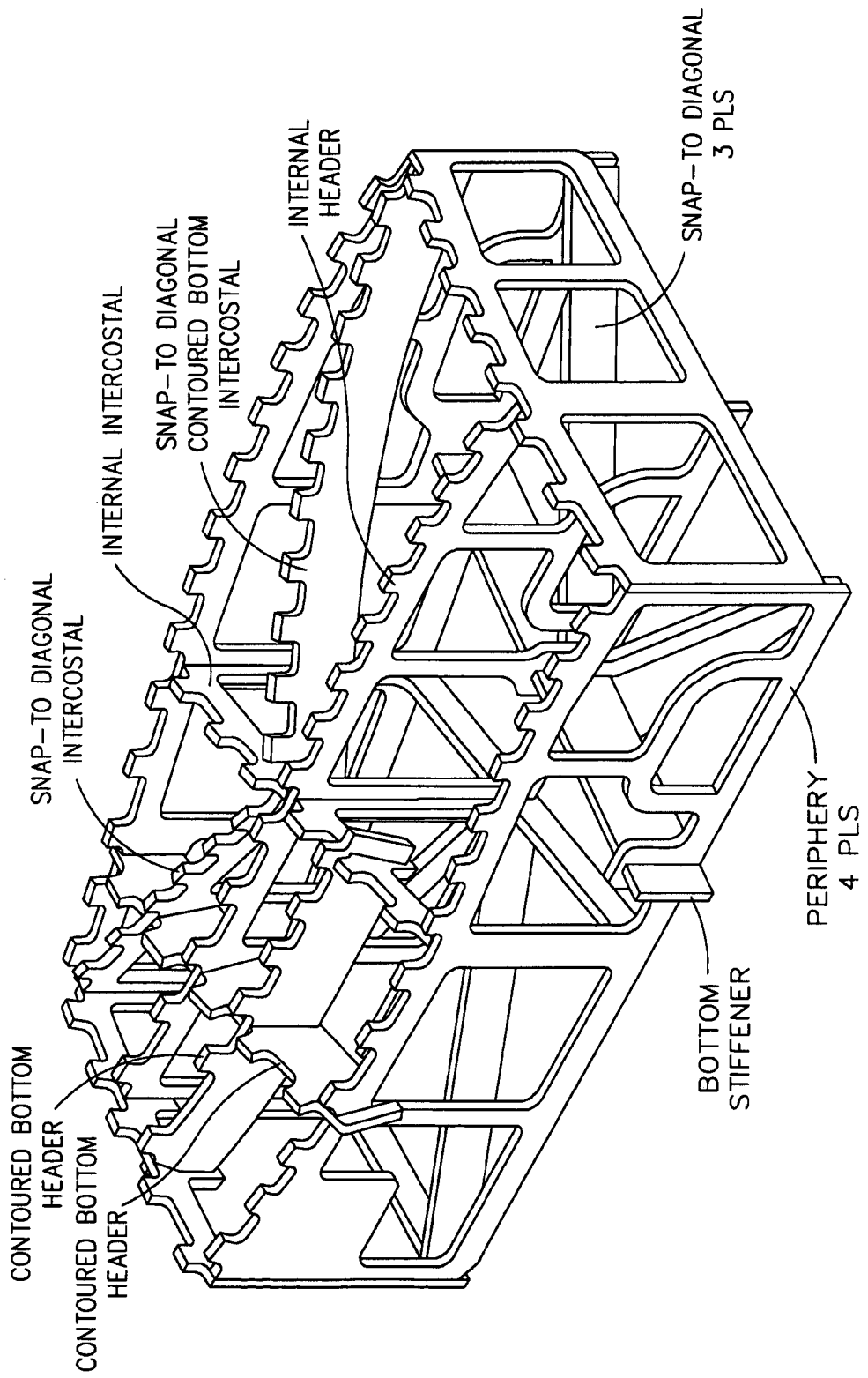
FIG. 19 is perspective of an exemplary output model table showing the various support types, diagonals and bottom stiffeners that can be generated from an input sketch according to one embodiment consistent with the present invention.
Figure 20A:
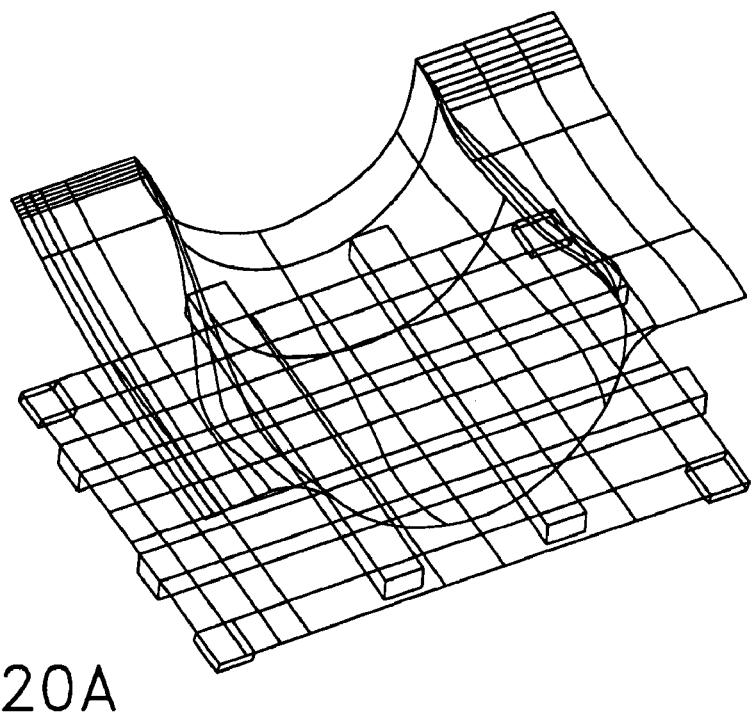
FIG. 20A through FIG. 20N are views of various exemplary input and output models showing three-dimensional space geometry according to one embodiment consistent with the present invention.
Figure 20B:
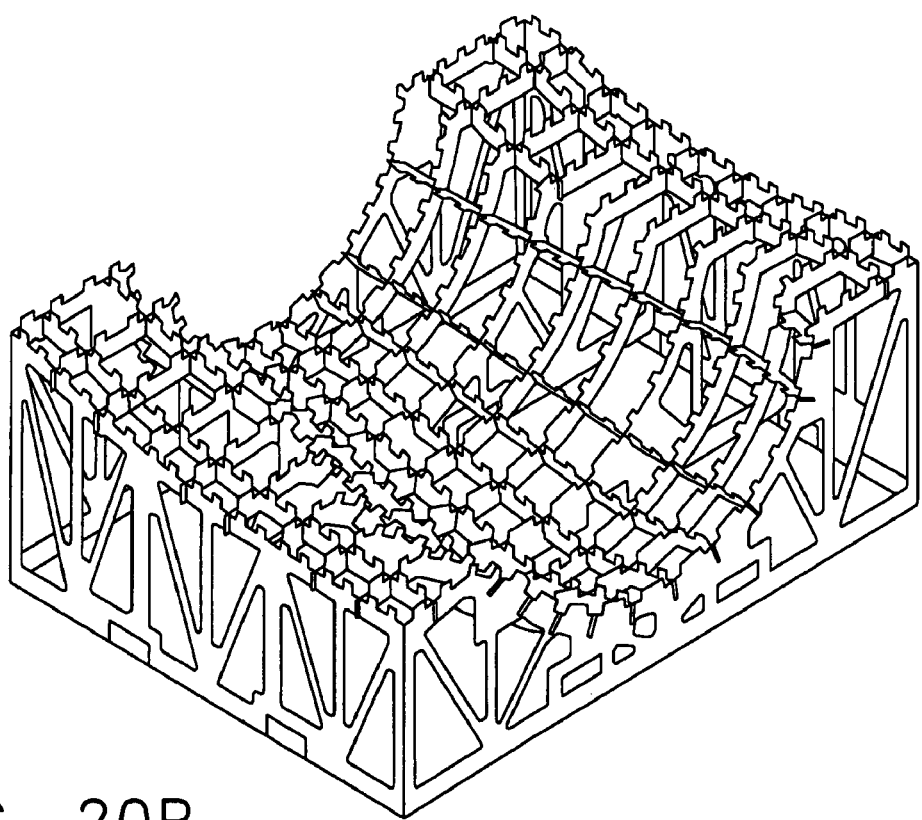
Figure 20C:
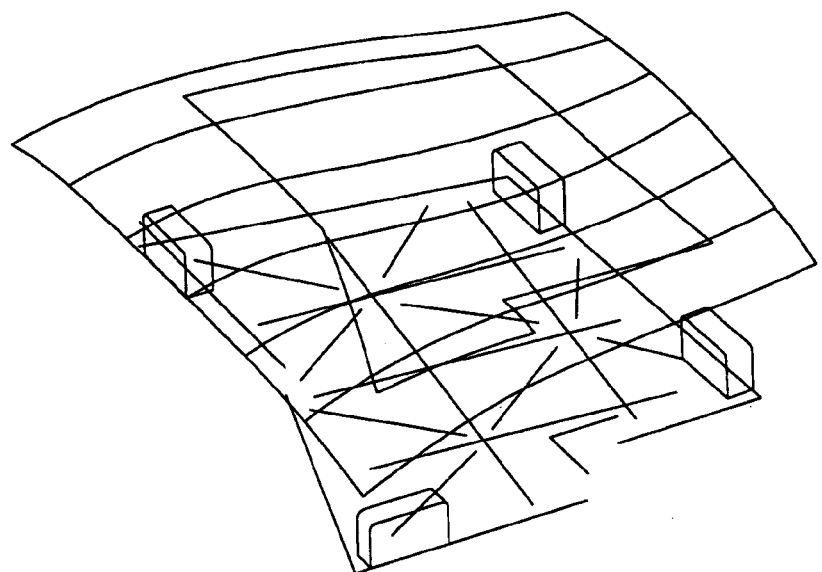
Figure 20D:
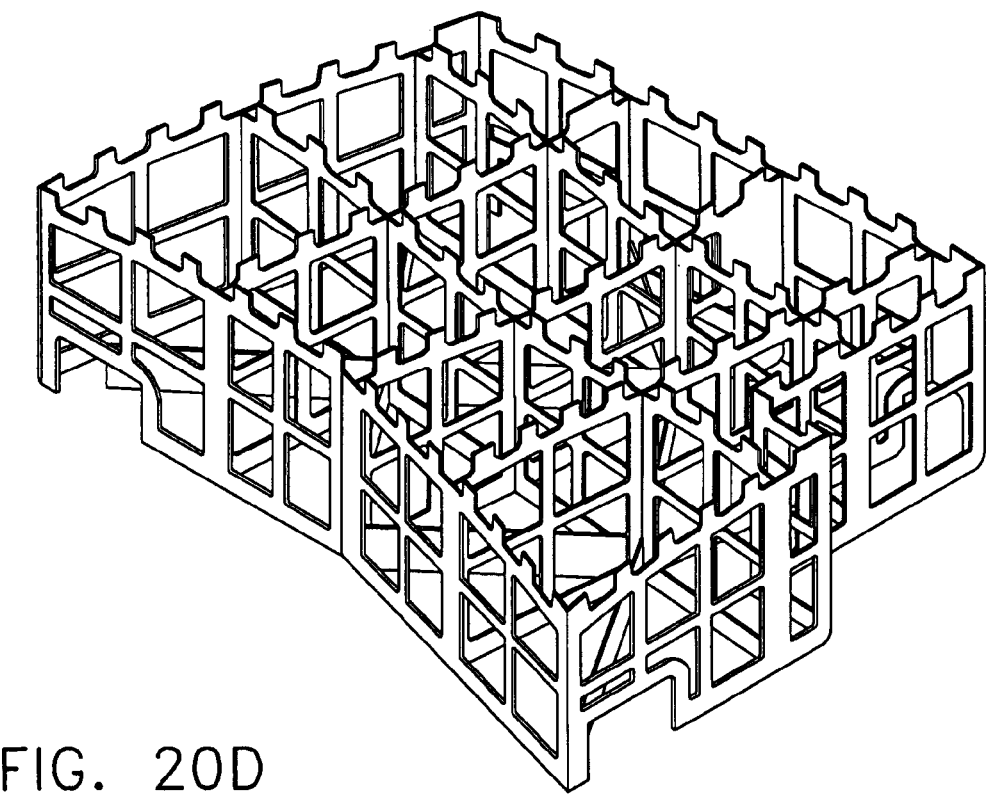
Figure 20E:
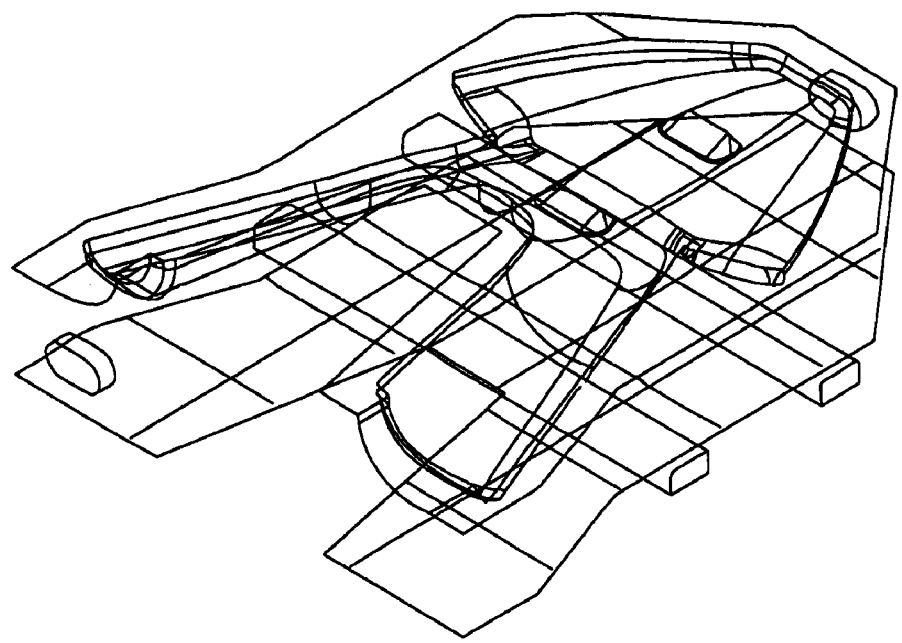
Figure 20F:
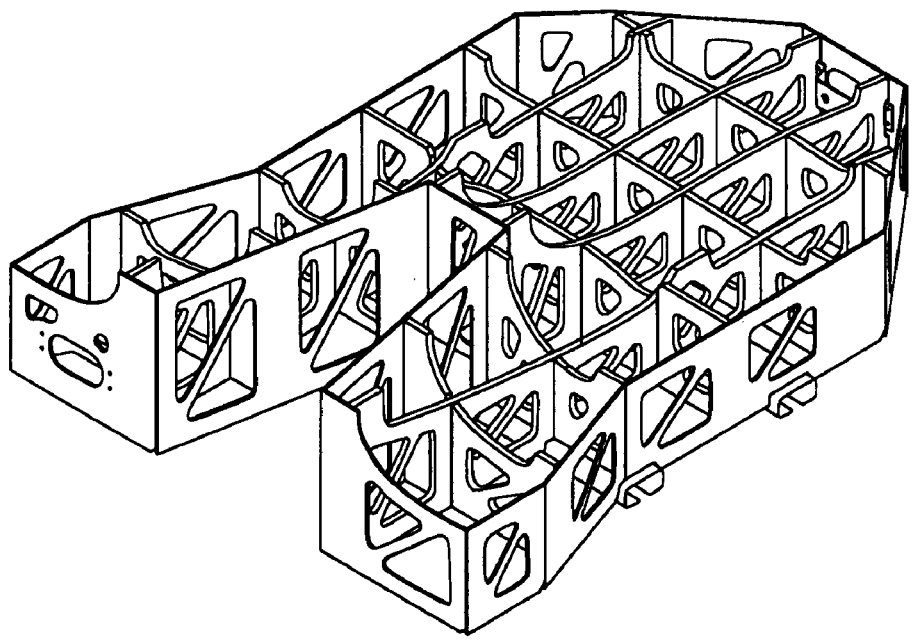
Figure 20G:
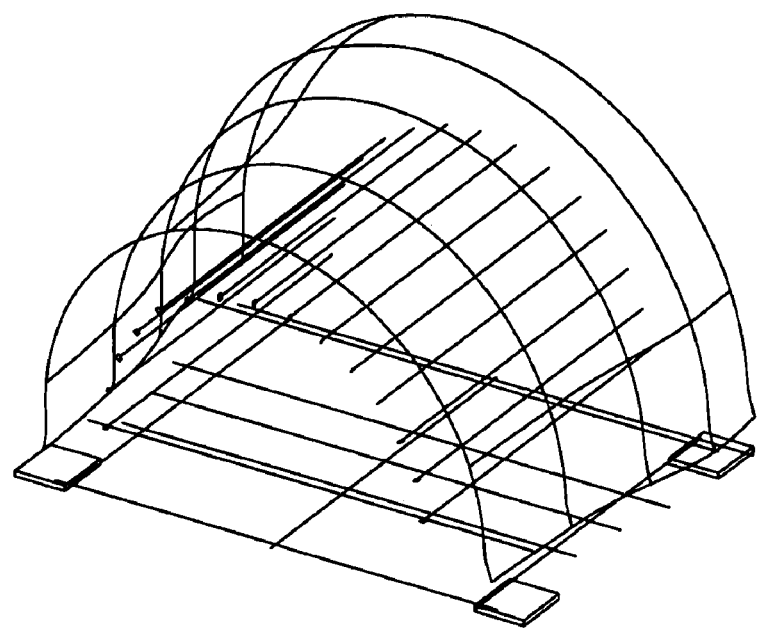
Figure 20H:
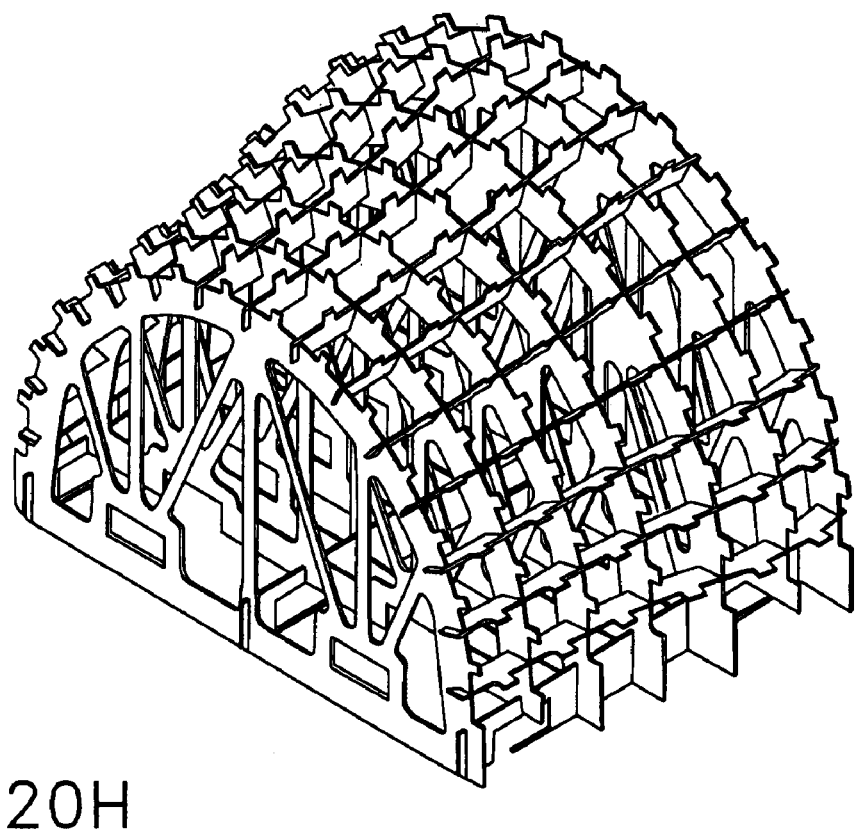
Figure 20I:
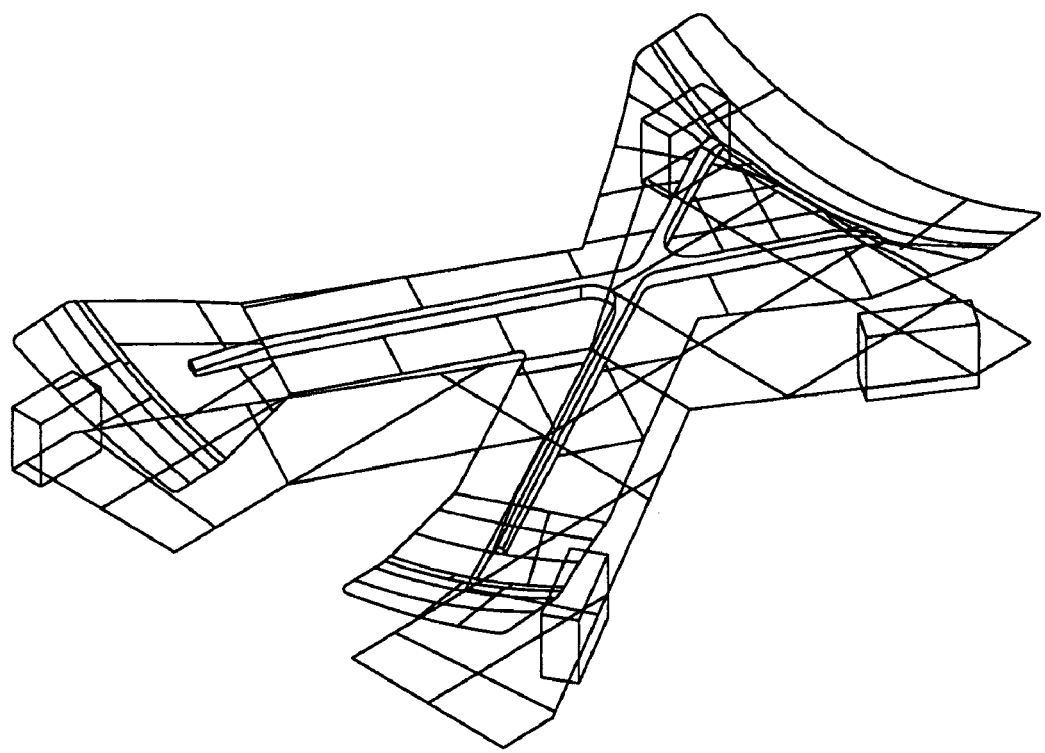
Figure 20J:
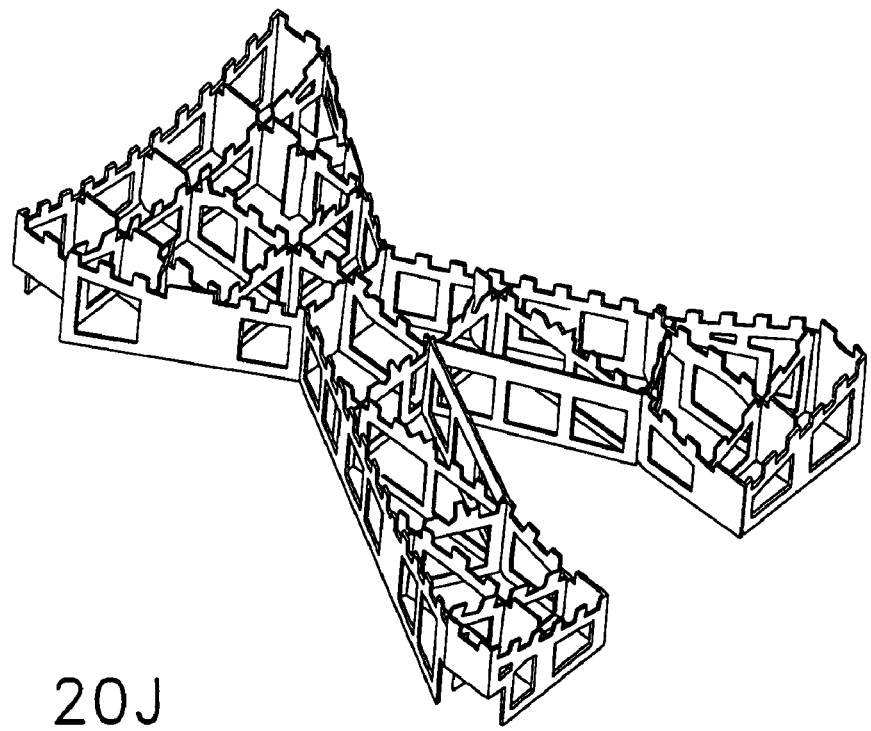
Figure 20K:
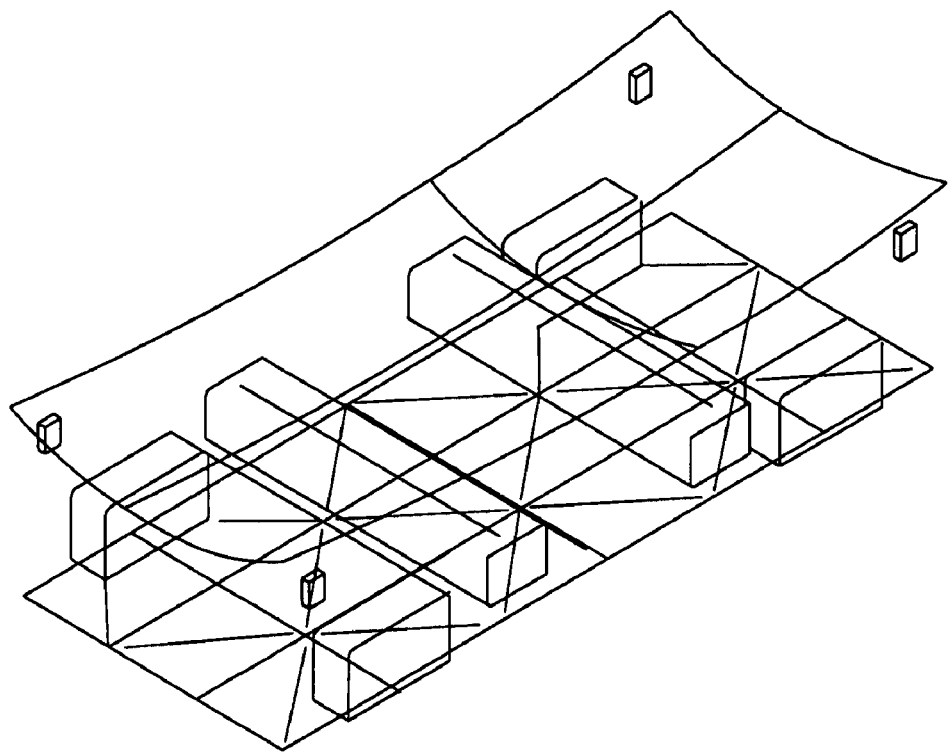
Figure 20L:
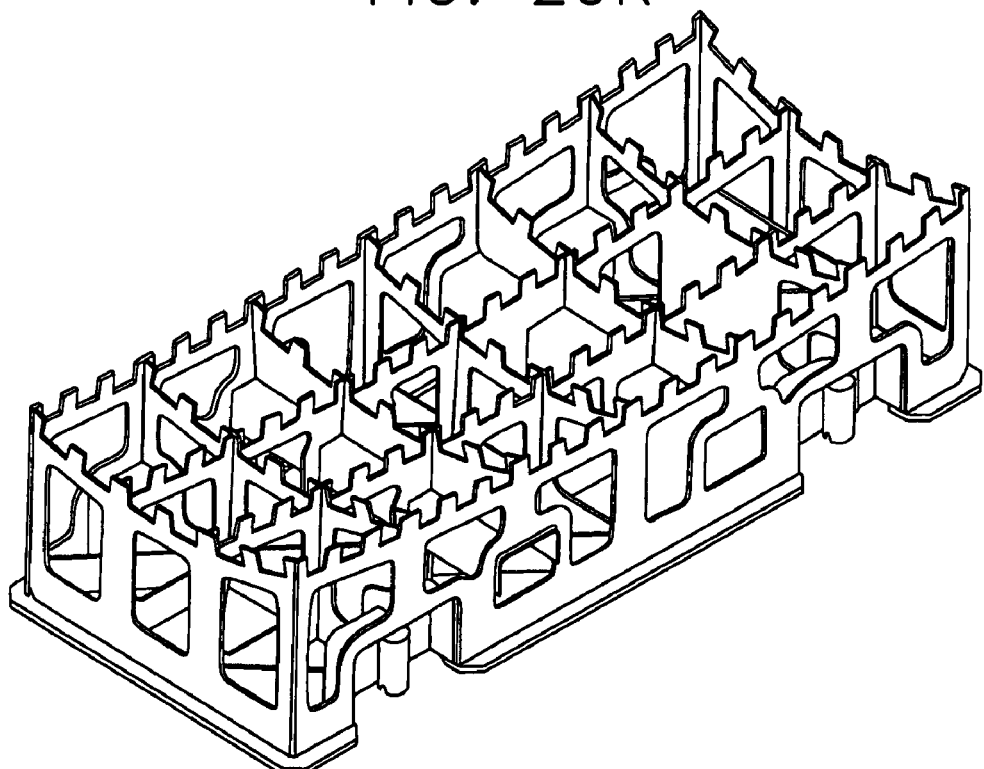
Figure 20M:
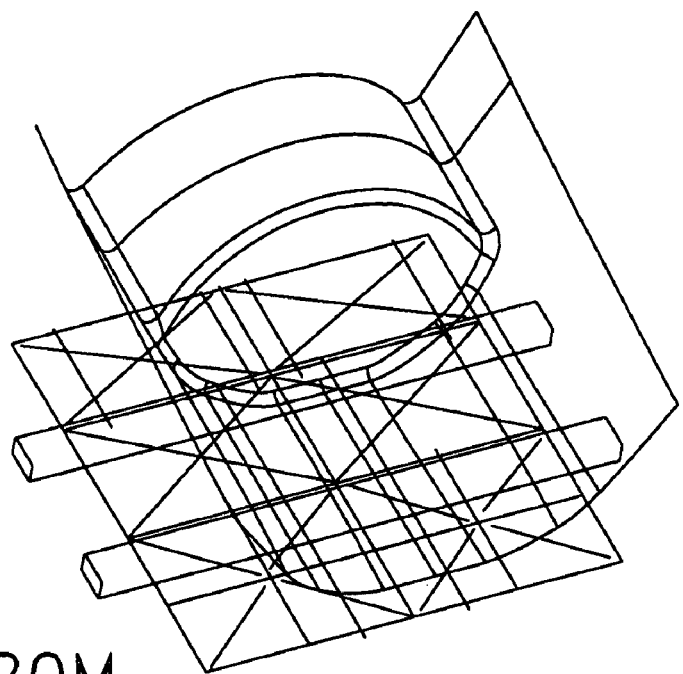
Figure 20N:
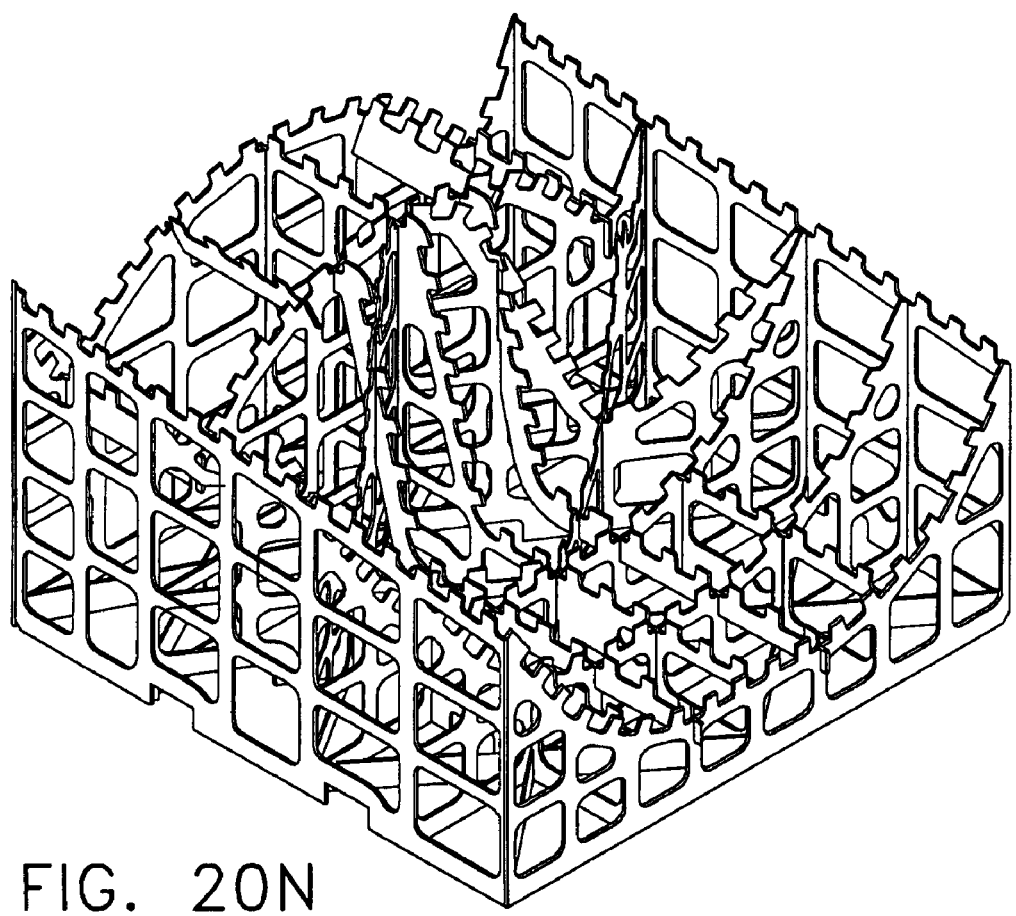

Lines must be input representing the bottom centerline location of each support and diagonal to be created. FIG. 19 shows the various types of supports and diagonals that can be generated from the sketched bottom centerlines. For non-quick type supports, the length of the line will be the length of the support. A plane, on which a bottom centerline lies, may also be created as part of the sketch to give the bottom centerline a z-axis vector other than that of the tool axis. The plane should be of the same color and on the same layer as the bottom center line in order to group the two geometric parts together and represent the desired support within the 3D sketch.

Interlock slots are created where two supports cross or overlap each other. The sub-type of support (intercostal, header, periphery, etc.) determines which edge, top or bottom, of the support the open end of interlock slot will face. For quick type supports the bottom centerlines do not need to take into account the thickness of each support.

Other features consistent with the present invention include:
1) Cutout areas (holes) made from input solids are always perpendicular to the support.
2) Fillets can be made for almost any two-dimensional (2D) wireframe profile in a predictable manner, even when part of the profile must be removed or split into multiple profiles.
3) Q-Periphery support locations only need to be sketched.
4) Q-Internal header support locations only need to be sketched.
5) Q-Internal intercostals support locations only need to be sketched.
6) Trimming or extending of internal supports to other supports is handled by the application.
7) Solids in the input CAD model can be used to represent the placement of any non-eggcrate part in the design (i.e., forklift tubes, lift rings, etc.) and eggcrate features will be generated to accommodate these parts in the design. Simple extruded solids must be used for this purpose when the input model from CATIA.
8) The support top edge is generated so that it is at a right angle to the support sides and only makes contact with the bottom of the tool face sheet even with highly contoured parts.
9) Snap-to Diagonals only need to be sketched.

Thus, in the present invention, the input model is prepared where a sketch is made where the locations do not have to be exact in length or complete. The periphery can have as many sides as desired—intersections between periphery supports are possible and a mix of Q-Periphery and non-Q-Periphery locations is allowed. There is also a 3D component, where lines do not have to lie in the same plane—but lines are connected when the user looks down at the sketch.

Once the inputs are entered by the user, the inputs may be stored and recalled by assigning them a name.

When the user is ready to generate the model that has been defined using the previously described inputs, the user can obtain the output model by launching the program as a batch job, for example, via the web page in step S200 (see FIG. 2). The batch job process is launched from any web browser using the application web launch page. The program will present application specific windows, then finally, the launch window(s). A batch job is submitted once all the windows are properly filled out by the user, and the user IDs and passwords are accepted by the program.

The flow chart in FIG. 2 shows the tier I flow of the ITS batch job submitted from the web launch page.

Figure 14:
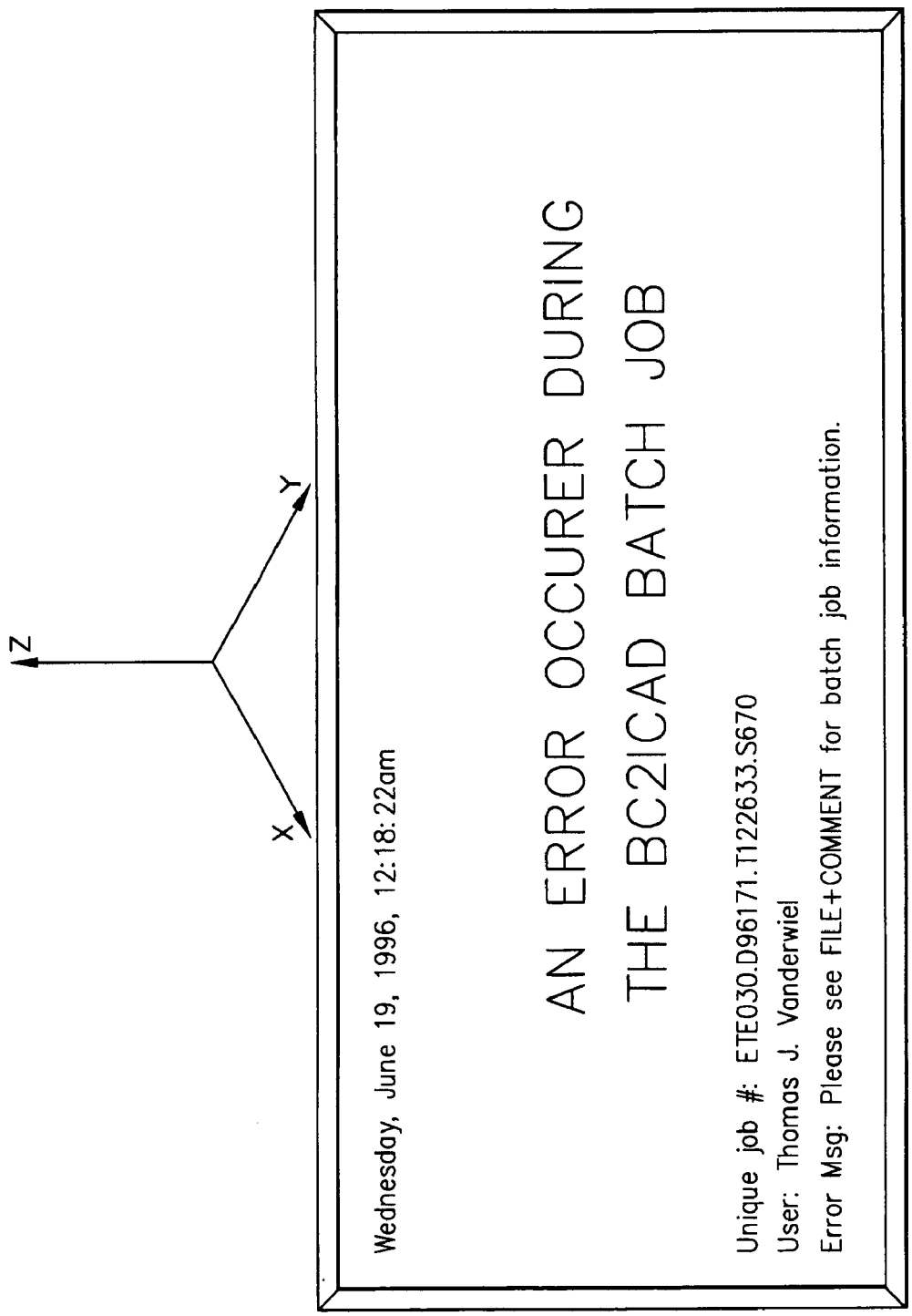
FIG. 14 is an error message presented by the program if the batch job fails according to one embodiment consistent with the present invention.

If the program is unable to run, and the batch job fails, an error message similar to the one shown in FIG. 14 will be contained in the returned CATIA model. After receiving an error message, all inputs to the batch job should be verified prior to launching the application again. The CATIA OUTPUT model comments page will contain information about the error that occurred.

In step S300, the user verifies the output model exists by running CATIA or other CAD program.

In step S400, the CAD program presents the output model for review by the user. The CAD output model contains both 3D space and 2D draw geometry, as shown by an exemplary model (see FIG. 13). The 3D space geometry may be used to verify the substructure against the input surfaces.

In step S500, the user makes a determination of whether the output is acceptable.

In step S600, if the output model is not acceptable, the user may make changes to the input model or batch job inputs, which include the 3D sketch and web or interactive inputs, and then run the program again as in step S200. Changes can be made on finer detail using the keywords etc., i.e., thickness of a support. Major changes do not have to be made before running the batch job over again. When running the application using the batch process inputs, such as thickness and AC notch inputs, can not be controlled for each individual support. Some inputs can be set or modified for each type of support (see FIGS. 7, 8 & 9) and some apply to all of the supports using that feature. This is only a limitation of the batch process web launch input pages. To reduce overhead, batch jobs are preferably run, but it is possible for the program to be interactive and simultaneous, and to see changes to the model after the user enters or changes each input. Running the application interactively allows greater controls of the inputs and features for each individual support or diagonal and the substructure.

Note that several iterations may be necessary in order to produce the desired substructure design. As stated previously, this is accomplished by changing the inputs—both the CATIA/CAD input model and/or web inputs—to the application and running another batch job.

If in step S500, the user believes the output to be acceptable, then the next step S700, which is optional, is to merge the ITS Spec Sheet into the tool drawing CAD model.

In that event, the layer for which each support is output on defaults to the layer that its bottom centerline is on. This also holds true for diagonals. The input default-layer-offset may be used to move all of the support wireframe geometry to a new layer that is offset from which the support solid reside. A layer-offset input is also provided for each type of support.

In the next step S800, which is optional, a substructure flag note is added to the face of the drawing.

In a subsequent step S900, which is optional, the ITS output is sent to Tool Fabrication.

Finally, the formal output for NC Programming (tool fabrication) is prepared, and Tool Fabrication sends the formatted output to NC Programming.

The present invention reduces the time it takes to create an initial design of the eggcrate substructure for a new LM by 80+%. Using its ability to use a 3D sketch for inputs, a quick concept design can be done in as little as 20 minutes. Iterations can then be performed to fine tune the design and allow concurrent work to be done.

By utilizing the quick run time of the application, a designer can also quickly create tool concepts by creating a "napkin" type sketch of the tool. Since the application is very flexible it can be used on a wide variety of tools. Tool size and shape are not limited by the application. All support edges are generated such that they are always perpendicular to its sides, thus simplifying the manufacture of the supports from sheet material.

One of ordinary skill in the art would appreciate that the above-described embodiments of the invention are merely possible examples of implementations which are set forth for a clear understanding of the principles of the invention.

Thus, variations and modifications may be made to the above-described embodiments of the invention without departing from the spirit and principles of the invention. All such modifications and variations are intended to be included herein within the scope of the invention and protected by the following claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A computer-implemented method of creating a sketch-based eggcrate substructure for manufacturing composite parts, said method comprising:
creating an input computer model from a plurality of inputs; and
launching a batch job of said created input computer model, said batch job being adapted to automatically create a computer model of an eggcrate substructure from the input computer model.

2. A method in accordance with claim 1 wherein said input model is created using inputs including locations that are inexact and incomplete.

3. A method in accordance with claim 1 wherein said input model includes a periphery having at least one of a plurality of sides and intersections.

4. A method in accordance with claim 1 wherein said input model includes lines lying in at least one of a same and different planes.

5. A method in accordance with claim 1 wherein said inputs are stored and retrievable.

6. A method in accordance with claim 1 wherein said batch job is launched from a web page.

7. A method in accordance with claim 1 wherein when said batch job fails, an error message is provided.

8. A method in accordance with claim 7 further comprising re-launching said batch job when said batch job fails.

9. A method in accordance with claim 8 further comprising verifying said input model prior to re-launching said batch job.

10. A method in accordance with claim 1 further comprising obtaining an output model by running said batch job.

11. A method in accordance with claim 10 wherein said output model contains both three-dimensional space and two-dimensional draw geometry.

12. A method in accordance with claim 10 further comprising displaying said output model for review.

13. A method in accordance with claim 12 further comprising receiving verification that said output model is acceptable.

14. A method in accordance with claim 13 further comprising merging an ITS spec sheet into an output model tool drawing.

15. A method in accordance with claim 14 further comprising adding a substructure flag note to a face of said output model tool drawing.

16. A method in accordance with claim 15 further comprising sending said ITS spec sheet to tool fabrication.

17. A method in accordance with claim 16 further comprising:
preparing a formatted output for NC Programming; and
sending said formatted output to NC Programming.

18. A method in accordance with claim 12 further comprising changing said inputs when said output model is unacceptable, said changed inputs including three-dimensional sketch and at least one of web and interactive inputs.

19. A method in accordance with claim 18 further comprising repeating said batch job with said changed inputs.

20. A method in accordance with claim 18 wherein a display of said input model is interactively and simultaneously changed upon each changed input entry.

21. A method in accordance with claim 1 wherein said inputs include at least one of CAD and web inputs.

22. A method in accordance with claim 1, wherein said inputs include at least one of Geometry input Specs, Output Options, Top Curve Inputs, Interlock Slots, AC Notch Inputs, Diagonal Inputs, and Lightening Hole Set Inputs.

23. A method in accordance with claim 22 wherein said Geometry Input Specs group together geometric elements in a three-dimensional CAD sketch that represent a set of supports of a given type, a set of diagonals of a given type, both Stay-Out area Solids and Lightening Hole Stay-out Area Solids, and a set of at least one of surfaces and faces representing the bottom of a tool face sheet.

24. A method in accordance with claim 23 wherein said input model contains said three-dimensional sketch used to generate eggcrate supports.

25. A method in accordance with claim 23 wherein cutout areas made from input solids are always perpendicular to a support.

26. A method in accordance with claim 23 wherein fillets can be made for a two-dimensional wireframe profile in a predictable manner, even when part of the profile is removed.

27. A method in accordance with claim 23 wherein periphery header locations only need to be sketched.

28. A method in accordance with claim 23 wherein internal header locations only need to be sketched.

29. A method in accordance with claim 23 wherein internal intercostals locations only need to be sketched.

30. A method in accordance with claim 23 wherein snap-to diagonal locations only need to be sketched.

31. A method in accordance with claim 23 wherein internal supports are one of trimmed and extended to other supports.

32. A method in accordance with claim 23 wherein solids can be used to represent the placement of any non-eggcrate part in a design and eggcrate features will be generated to accommodate these parts in the design.

33. A method in accordance with claim 23 wherein a support top edge is generated so that it only makes contact with a bottom of said tool face sheet.

34. Apparatus for creating a sketch-based eggcrate substructure for manufacturing composite parts, said apparatus comprising:
means for creating an input computer model from a plurality of inputs; and
means for launching a batch job of said created input computer model, said batch job being adapted to automatically create a computer model of an eggcrate substructure from the input computer model.

35. Apparatus in accordance with claim 34 wherein said input model is created using inputs including locations that are inexact and incomplete.

36. Apparatus in accordance with claim 34 wherein said input model includes a periphery having at least one of a plurality of sides and intersections.

37. Apparatus in accordance with claim 34 wherein said input model includes lines lying in at least one of a same and different planes.

38. Apparatus in accordance with claim 34 wherein said inputs are stored and retrievable.

39. Apparatus in accordance with claim 34 wherein said batch job is launched from a web page.

40. Apparatus in accordance with claim 39 wherein when said batch job fails, an error message is provided.

41. Apparatus in accordance with claim 40 wherein when said batch job fails, said batch job is re-launched.

42. Apparatus in accordance with claim 40 wherein said input model is verified prior to re-launching said batch job.

43. Apparatus in accordance with claim 34 wherein an output model is obtained by running said batch job.

44. Apparatus in accordance with claim 43 wherein said output model contains both three-dimensional space and two-dimensional draw geometry.

45. Apparatus in accordance with claim 43 wherein said output model is displayed for review.

46. Apparatus in accordance with claim 45 wherein verification is received when said output model is acceptable.

47. Apparatus in accordance with claim 46 wherein when an output model tool drawing is obtained, an ITS spec sheet is merged into said output model tool drawing.

48. Apparatus in accordance with claim 47 wherein a substructure flagnote is added to a face of said output model tool drawing.

49. Apparatus in accordance with claim 48 wherein said ITS spec sheet is sent to tool fabrication.

50. Apparatus in accordance with claim 49 wherein a formatted output is prepared and sent to NC Programming.

51. Apparatus in accordance with claim 45 wherein when said output model is unacceptable, said inputs are changed, including three-dimensional sketch and at least one of web and interactive inputs.

52. Apparatus in accordance with claim 51 wherein said batch job is repeated with said changed inputs.

53. Apparatus in accordance with claim 52 wherein said changed inputs include a change in "type" of thickness.

54. Apparatus in accordance with claim 51 wherein a display of said input model is interactively and simultaneously changed upon each changed input entry.

55. Apparatus in accordance with claim 34 wherein said inputs include at least one of CAD and web inputs.

56. Apparatus in accordance with claim 34 wherein said inputs include at least one of Geometry Input Specs, Output Options, Top Curve Inputs, Interlock Slots, AC Notch Inputs, Diagonal Inputs, and Lightening Hole Set Inputs.

57. Apparatus in accordance with claim 56 wherein said Geometry Input Specs group together geometric elements in a three-dimensional CAD sketch that represent a set of supports of a given type, a set of diagonals of a given type, both Stay-Out area Solids and Lightening Hole Stay-out Area Solids, and a set of at least one of surfaces and faces representing a bottom of a tool face sheet.

58. Apparatus in accordance with claim 57 wherein said input model contains only said three-dimensional sketch used to generate eggcrate supports.

59. Apparatus in accordance with claim 57 wherein cutout areas made from input solids are always perpendicular to a support.

60. Apparatus in accordance with claim 57 wherein fillets can be made for a two-dimensional wireframe profile in a predictable manner, even when part of the profile is removed.

61. Apparatus in accordance with claim 57 wherein periphery header locations only need to be sketched.

62. Apparatus in accordance with claim 57 wherein internal header locations only need to be sketched.

63. Apparatus in accordance with claim 57 wherein internal intercostals locations only need to be sketched.

64. Apparatus in accordance with claim 57 wherein snap-to diagonal locations only need to be sketched.

65. Apparatus in accordance with claim 57 wherein internal supports are one of trimmed and extended to other supports.

66. Apparatus in accordance with claim 57 wherein solids can be used to represent the placement of any non-eggcrate part in a design and eggcrate features will be generated to accommodate these parts in the design.

67. Apparatus in accordance with claim 57 wherein a support top edge is generated so that it only makes contact with a bottom of said tool face sheet.

* * * * *